(12) United States Patent
Rane et al.

(10) Patent No.: US 12,434,897 B2
(45) Date of Patent: *Oct. 7, 2025

(54) CONTAINER AND LID

(71) Applicant: YETI Coolers, LLC, Austin, TX (US)

(72) Inventors: Mark Carlson Rane, Austin, TX (US); Andrew J. Winterhalter, Austin, TX (US); Edward Naguit Abante, Austin, TX (US); Desiree Hunter, Austin, TX (US); Robert Throop, Austin, TX (US); Elizaveta Morris, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 736 days.

This patent is subject to a terminal disclaimer.

(21) Appl. No.: 17/363,430

(22) Filed: Jun. 30, 2021

(65) Prior Publication Data

US 2021/0394992 A1 Dec. 23, 2021

Related U.S. Application Data

(63) Continuation of application No. 15/950,452, filed on Apr. 11, 2018, now Pat. No. 11,072,469.

(Continued)

(51) Int. Cl.
*B65D 81/38* (2006.01)
*B65D 25/28* (2006.01)
(Continued)

(52) U.S. Cl.
CPC ....... *B65D 81/383* (2013.01); *B65D 25/2802* (2013.01); *B65D 43/0229* (2013.01);
(Continued)

(58) Field of Classification Search
CPC ............ B65D 51/1644; B65D 51/1683; B65D 2543/00231
See application file for complete search history.

(56) References Cited

U.S. PATENT DOCUMENTS

| 769,615 A | 9/1904 | Kosansvich |
| 1,324,653 A | 12/1919 | Ferdon |

(Continued)

FOREIGN PATENT DOCUMENTS

| AU | 2010100178 A4 | 3/2010 |
| CN | 201116176 Y | 9/2008 |

(Continued)

OTHER PUBLICATIONS

650ml Stainless Steel Vacuum Insulation Barrels Boxes Portable Lunch Box Soup Bucket [online], [retrieved Nov. 3, 2017], Retrieved from the Internet, URL: <http://www.11street.my/productdetail/650ml-stainless-steel-vacuum-insulation-barrels-12481058>; 3 color pages, published date unknown but for the purposes of patent prosecution presumably more than a year prior to the filing date of the present application.

(Continued)

*Primary Examiner* — Don M Anderson
(74) *Attorney, Agent, or Firm* — Banner & Witcoff, Ltd.

(57) ABSTRACT

An insulated container having a canister can be sealed by a lid structure. The lid structure can be a multi-part insulated lid. The lid can include a vent configured to vent air from inside the canister. In addition, the container may be part of a container kit or container system where one or more inner containers, are nested and secured within the insulated container.

21 Claims, 32 Drawing Sheets

Related U.S. Application Data

(60) Provisional application No. 62/546,767, filed on Aug. 17, 2017.

(51) Int. Cl.
  *B65D 43/02* (2006.01)
  *B65D 51/16* (2006.01)
  *B65D 51/24* (2006.01)

(52) U.S. Cl.
  CPC ..... *B65D 43/0231* (2013.01); *B65D 51/1644* (2013.01); *B65D 51/1683* (2013.01); *B65D 51/242* (2013.01); *B65D 2543/00092* (2013.01); *B65D 2543/00231* (2013.01); *B65D 2543/0049* (2013.01); *B65D 2543/00537* (2013.01); *B65D 2543/00851* (2013.01); *B65D 2543/00972* (2013.01)

(56) References Cited

U.S. PATENT DOCUMENTS

| | | |
|---|---|---|
| 1,362,933 A | 12/1920 | Ferdon |
| 1,472,667 A | 10/1923 | Nelson |
| 1,573,620 A | 2/1926 | Allston |
| 1,871,138 A | 8/1932 | Ward, Jr. |
| 2,010,812 A | 8/1935 | Devine |
| 2,184,336 A | 12/1939 | Devine |
| 2,488,611 A | 11/1949 | Stallings |
| 2,519,862 A | 8/1950 | Verheyden |
| D160,648 S | 10/1950 | Munk |
| 2,575,770 A | 11/1951 | Roop |
| 2,663,450 A | 12/1953 | Bourcart |
| 2,872,095 A | 2/1959 | Adams |
| 2,960,250 A | 11/1960 | Haloski |
| 2,963,187 A | 12/1960 | Bramming |
| 3,067,896 A | 12/1962 | Berg et al. |
| 3,093,238 A | 6/1963 | King, III |
| 3,096,897 A | 7/1963 | Hansen |
| 3,117,692 A | 1/1964 | Carpenter et al. |
| 3,223,279 A | 12/1965 | Wheaton |
| 3,243,038 A | 3/1966 | Caramanian |
| 3,266,623 A | 8/1966 | Poferl |
| 3,385,465 A | 5/1968 | Bliss |
| 3,910,461 A * | 10/1975 | Eager ............... F25D 3/14 222/131 |
| 4,119,231 A | 10/1978 | Johnson |
| 4,126,246 A | 11/1978 | Galer |
| 4,242,834 A | 1/1981 | Olsen |
| 4,368,819 A | 1/1983 | Durham |
| D278,413 S | 4/1985 | Woodcock et al. |
| D279,346 S | 6/1985 | Ruxton |
| 4,638,645 A | 1/1987 | Simila |
| 4,756,424 A | 7/1988 | Schwartz |
| 4,804,101 A | 2/1989 | Heath |
| 4,930,636 A | 6/1990 | Meadows |
| D313,353 S | 1/1991 | Hart et al. |
| 5,086,926 A | 2/1992 | Paige et al. |
| 5,154,303 A | 10/1992 | Jordan |
| D336,817 S | 6/1993 | Wilcox, Jr. |
| D341,320 S | 11/1993 | Morin |
| D342,134 S | 12/1993 | Mongeon |
| D345,485 S | 3/1994 | Leung |
| 5,335,809 A | 8/1994 | Toida et al. |
| 5,386,922 A | 2/1995 | Jordan |
| D363,642 S | 10/1995 | Goto et al. |
| D364,533 S | 11/1995 | Brophy |
| 5,509,551 A | 4/1996 | Terrell, II |
| 5,540,329 A | 7/1996 | Vogeley |
| 5,549,039 A | 8/1996 | Ito et al. |
| D375,657 S | 11/1996 | Jarvis |
| 5,669,498 A | 9/1997 | Fierek et al. |
| 5,671,856 A | 9/1997 | Lisch |
| D394,184 S | 5/1998 | Demore |
| 5,858,263 A | 1/1999 | Geary |
| 5,884,796 A | 3/1999 | Hallmark |
| 5,890,614 A | 4/1999 | Dancyger |
| 5,950,913 A | 9/1999 | Rea et al. |
| 6,029,457 A | 2/2000 | Neeser et al. |
| 6,036,801 A | 3/2000 | Yamada et al. |
| H1855 H | 8/2000 | Litton et al. |
| 6,119,889 A | 9/2000 | Fujii et al. |
| 6,151,910 A | 11/2000 | Hazen |
| 6,168,040 B1 | 1/2001 | Sautner et al. |
| 6,209,725 B1 | 4/2001 | Chen |
| 6,418,731 B1 | 7/2002 | Anthony |
| 6,419,108 B1 | 7/2002 | Toida et al. |
| D466,814 S | 12/2002 | Hurlburt |
| 6,530,496 B2 | 3/2003 | Moran |
| D476,858 S | 7/2003 | Slater et al. |
| D477,752 S | 7/2003 | Slater et al. |
| D479,951 S | 9/2003 | Segura |
| 6,659,302 B2 | 12/2003 | Lin |
| 6,726,047 B2 | 4/2004 | Lin |
| D493,677 S | 8/2004 | Meyer |
| 6,779,679 B1 | 8/2004 | Dias, Jr. et al. |
| D497,778 S | 11/2004 | Rich |
| 6,832,705 B2 | 12/2004 | Hollander et al. |
| D514,936 S | 2/2006 | Pace et al. |
| D515,866 S | 2/2006 | Wiedmeyer et al. |
| D516,375 S | 3/2006 | Cioeta et al. |
| D516,910 S | 3/2006 | Bresler |
| 7,014,074 B1 * | 3/2006 | Rinaldi ............... B65D 41/065 222/461 |
| 7,073,678 B1 | 7/2006 | Dibdin et al. |
| D527,219 S | 8/2006 | Trombly |
| D552,413 S | 10/2007 | Laib et al. |
| D557,994 S | 12/2007 | Wahl |
| D562,624 S | 2/2008 | Kortleven |
| 7,350,657 B2 | 4/2008 | Eaton et al. |
| 7,401,708 B2 | 7/2008 | Lin |
| D574,708 S | 8/2008 | Reed et al. |
| D579,720 S | 11/2008 | Rohe |
| D581,809 S | 12/2008 | Wichowski |
| D582,275 S | 12/2008 | Reed et al. |
| D583,200 S | 12/2008 | Moran |
| D584,103 S | 1/2009 | Valderrama et al. |
| D585,245 S | 1/2009 | Brouillette |
| D587,115 S | 2/2009 | Capretta et al. |
| 7,487,883 B2 | 2/2009 | Waters |
| D587,534 S | 3/2009 | Carreno |
| D592,954 S | 5/2009 | Capretta et al. |
| D593,811 S | 6/2009 | Carreno |
| 7,559,274 B2 | 7/2009 | Wilhite |
| D606,864 S | 12/2009 | Robinson |
| D608,195 S | 1/2010 | Germann |
| D609,521 S | 2/2010 | Holsinger |
| D612,235 S | 3/2010 | Cresswell et al. |
| D612,240 S | 3/2010 | Cresswell et al. |
| 7,686,168 B1 | 3/2010 | Smiley et al. |
| 7,726,483 B2 | 6/2010 | Ramanujam et al. |
| D620,357 S | 7/2010 | Jewett et al. |
| D620,798 S | 8/2010 | Cresswell et al. |
| D622,089 S | 8/2010 | Daniel et al. |
| D622,554 S | 8/2010 | Carreno |
| D623,480 S | 9/2010 | Moran |
| D623,481 S | 9/2010 | Moran |
| D623,896 S | 9/2010 | Wahl et al. |
| D624,413 S | 9/2010 | Selina et al. |
| D626,416 S | 11/2010 | Cresswell et al. |
| D628,486 S | 12/2010 | Lane |
| D628,857 S | 12/2010 | Tatsukawa |
| D629,657 S | 12/2010 | Carreno |
| D630,475 S | 1/2011 | Lu |
| D635,393 S | 4/2011 | Nakatani |
| D635,457 S | 4/2011 | Lane |
| D641,206 S | 7/2011 | Heiberg et al. |
| D641,591 S | 7/2011 | Tsukida |
| 7,988,005 B2 | 8/2011 | Wagner |
| D645,349 S | 9/2011 | Tilton |
| D651,050 S | 12/2011 | Goshi |
| D652,255 S | 1/2012 | Carland |
| D660,084 S | 5/2012 | Gilbert |
| D660,655 S | 5/2012 | Wahl et al. |
| D660,657 S | 5/2012 | Picozza et al. |

(56) References Cited

U.S. PATENT DOCUMENTS

| | | |
|---|---|---|
| D666,061 S | 8/2012 | Ying |
| D673,047 S | 12/2012 | Stamper et al. |
| 8,328,014 B2 | 12/2012 | Saunders et al. |
| D675,100 S | 1/2013 | Herbst |
| 8,342,349 B2 | 1/2013 | Lu |
| 8,360,048 B2 | 1/2013 | Ford et al. |
| D679,959 S | 4/2013 | Lane |
| D680,431 S | 4/2013 | Hopkins et al. |
| D682,625 S | 5/2013 | Lane |
| D682,626 S | 5/2013 | Lane |
| 8,448,801 B2 | 5/2013 | Rusnak et al. |
| D685,231 S | 7/2013 | Lane |
| D685,232 S | 7/2013 | Lane |
| D691,245 S | 10/2013 | Ho |
| 8,561,825 B1 | 10/2013 | Kino et al. |
| 8,584,891 B2 | 11/2013 | Hutchinson et al. |
| D696,079 S | 12/2013 | Meyers et al. |
| D696,790 S | 12/2013 | Nemeth |
| 8,631,957 B2 | 1/2014 | Dart et al. |
| D702,506 S | 4/2014 | Mettler et al. |
| 8,701,887 B2 | 4/2014 | Baker et al. |
| 8,752,720 B1 * | 6/2014 | Habig ............... A47G 19/2266 220/375 |
| D708,010 S | 7/2014 | Gillette et al. |
| D708,912 S | 7/2014 | DeCraim |
| 8,783,482 B2 | 7/2014 | Bou Mezrag et al. |
| D710,155 S | 8/2014 | Tatsukawa |
| D710,696 S | 8/2014 | Kwon |
| 8,800,796 B2 | 8/2014 | Wagner |
| D713,365 S | 9/2014 | Green |
| D715,590 S | 10/2014 | Mangano |
| 8,857,209 B2 | 10/2014 | Wang |
| D717,114 S | 11/2014 | Katterheinrich et al. |
| D717,469 S | 11/2014 | Nemeth |
| 8,919,591 B2 | 12/2014 | Cai et al. |
| D722,476 S * | 2/2015 | Kilduff ............... D7/630 |
| D723,370 S | 3/2015 | Medlin |
| 9,016,508 B1 | 4/2015 | Leighton et al. |
| 9,051,095 B2 | 6/2015 | Antal, Sr. |
| 9,102,439 B2 | 8/2015 | Kemper et al. |
| 9,120,598 B2 | 9/2015 | Meyers et al. |
| 9,216,843 B2 | 12/2015 | Sorensen et al. |
| D749,948 S | 2/2016 | Groglopo Favetto |
| 9,254,063 B2 | 2/2016 | Libourel et al. |
| 9,278,781 B1 | 3/2016 | Boldis |
| 9,322,588 B2 | 4/2016 | Carroll et al. |
| D755,561 S | 5/2016 | Eyal |
| D758,859 S | 6/2016 | Sorensen et al. |
| D760,586 S | 7/2016 | Seiders et al. |
| D766,668 S | 9/2016 | Garcia |
| D766,717 S | 9/2016 | Sheikh |
| 9,452,876 B2 | 9/2016 | Anelevitz et al. |
| D769,079 S | 10/2016 | Kotani |
| D770,239 S | 11/2016 | Lonner et al. |
| D770,240 S | 11/2016 | Stover |
| 9,492,024 B2 | 11/2016 | Sorensen et al. |
| D774,362 S | 12/2016 | Wahl |
| D774,837 S | 12/2016 | Seiders et al. |
| 9,516,974 B2 | 12/2016 | Herling et al. |
| D775,496 S | 1/2017 | Szucs et al. |
| D780,577 S | 3/2017 | Seiders et al. |
| D781,145 S | 3/2017 | Seiders et al. |
| D781,146 S | 3/2017 | Seiders et al. |
| D782,253 S | 3/2017 | Boroski et al. |
| D782,881 S | 4/2017 | Seiders et al. |
| D783,367 S | 4/2017 | Seiders et al. |
| D783,368 S | 4/2017 | Seiders et al. |
| D784,093 S | 4/2017 | Boroski et al. |
| D784,775 S | 4/2017 | Seiders et al. |
| D787,317 S | 5/2017 | Dunn et al. |
| D788,544 S | 6/2017 | Seiders et al. |
| D790,285 S | 6/2017 | Seiders et al. |
| D795,705 S | 8/2017 | Huang |
| 9,771,189 B2 * | 9/2017 | Miksovsky ............ B65D 55/16 |
| D804,304 S | 12/2017 | Pearson |
| D805,852 S | 12/2017 | Seiders et al. |
| D808,263 S | 1/2018 | Patel |
| D808,713 S | 1/2018 | Rane et al. |
| D811,162 S | 2/2018 | Rane et al. |
| D814,928 S | 4/2018 | Seiders et al. |
| D816,493 S | 5/2018 | Seiders et al. |
| D819,396 S | 6/2018 | Seiders et al. |
| D820,650 S | 6/2018 | Seiders et al. |
| D821,135 S | 6/2018 | Rane et al. |
| D821,807 S | 7/2018 | Yap et al. |
| D831,436 S | 10/2018 | Seiders et al. |
| D832,704 S | 11/2018 | Seiders et al. |
| D834,366 S | 11/2018 | Ulanski et al. |
| 2001/0052531 A1 * | 12/2001 | Randall ............... B65D 47/0809 222/521 |
| 2002/0031462 A1 | 3/2002 | Jorgensen |
| 2004/0124114 A1 | 7/2004 | Sellers |
| 2004/0140308 A1 * | 7/2004 | Maenke ............... B65D 7/045 220/373 |
| 2005/0145633 A1 | 7/2005 | Goto et al. |
| 2006/0186125 A1 | 8/2006 | Tew |
| 2008/0006642 A1 | 1/2008 | Hidary |
| 2008/0006643 A1 | 1/2008 | Ma |
| 2008/0217335 A1 * | 9/2008 | Chen ............... B65D 81/2038 220/231 |
| 2008/0314909 A1 | 12/2008 | Takeo et al. |
| 2009/0057312 A1 | 3/2009 | Beyers, III |
| 2009/0071968 A1 | 3/2009 | O'Brien |
| 2009/0212059 A1 | 8/2009 | Chen |
| 2009/0255942 A1 * | 10/2009 | Omdoll ............... B65D 1/0284 220/608 |
| 2009/0266737 A1 | 10/2009 | Cole |
| 2010/0078435 A1 | 4/2010 | Wang |
| 2010/0089857 A1 | 4/2010 | Dinerstein et al. |
| 2010/0108694 A1 | 5/2010 | Sedlbauer et al. |
| 2010/0200532 A1 | 8/2010 | Ekkert |
| 2011/0163102 A1 | 7/2011 | Haynie |
| 2011/0186585 A1 | 8/2011 | Lu |
| 2011/0198352 A1 * | 8/2011 | Lown ............... B65D 47/32 220/254.8 |
| 2012/0018317 A1 | 1/2012 | Rein |
| 2012/0018430 A1 * | 1/2012 | Bork ............... B65D 51/1644 220/203.28 |
| 2012/0037646 A1 | 2/2012 | Dunwoody et al. |
| 2012/0043334 A1 | 2/2012 | Nowzari |
| 2012/0074143 A1 * | 3/2012 | Lin ............... A47J 41/0088 220/259.4 |
| 2012/0199548 A1 * | 8/2012 | Kitto ............... B65D 55/16 215/316 |
| 2013/0008909 A1 | 1/2013 | Terracciano |
| 2013/0175250 A1 | 7/2013 | Saatkamp et al. |
| 2013/0248537 A1 | 9/2013 | Lane |
| 2014/0061210 A1 | 3/2014 | O'Hanley et al. |
| 2014/0069917 A1 * | 3/2014 | Meyers ............... B65D 21/022 220/23.88 |
| 2014/0091097 A1 | 4/2014 | Lane |
| 2014/0202597 A1 | 7/2014 | Waniuk |
| 2014/0262899 A1 * | 9/2014 | Mociak ............... B65D 51/24 206/459.1 |
| 2014/0305947 A1 * | 10/2014 | Lee ............... B65D 45/16 220/573.1 |
| 2015/0053679 A1 * | 2/2015 | Liu ............... B65D 43/0231 220/215 |
| 2015/0136797 A1 | 5/2015 | Li |
| 2015/0197390 A1 | 7/2015 | Kurabe et al. |
| 2015/0232232 A1 * | 8/2015 | Shibuki ............... B65D 81/3841 220/592.16 |
| 2015/0282652 A1 | 10/2015 | Honarvar et al. |
| 2015/0284138 A1 | 10/2015 | Lane et al. |
| 2015/0366236 A1 | 12/2015 | Inoue |
| 2016/0150902 A1 | 6/2016 | Dokhanian et al. |
| 2016/0214783 A1 | 7/2016 | Xie |
| 2016/0318693 A1 * | 11/2016 | Hein ............... B65D 81/3841 |
| 2016/0354775 A1 | 12/2016 | Bruno et al. |
| 2016/0355318 A1 | 12/2016 | Epenetos et al. |
| 2017/0073147 A1 | 3/2017 | Kuhn |
| 2017/0144811 A1 * | 5/2017 | Wohlgenannt ......... B65D 47/36 |

(56) References Cited

U.S. PATENT DOCUMENTS

| | | | |
|---|---|---|---|
| 2017/0217638 A1 | | 8/2017 | Faria et al. |
| 2018/0050845 A1* | | 2/2018 | Chin .................. A47J 41/0016 |
| 2018/0362225 A1* | | 12/2018 | Davies ................. B65D 51/242 |

FOREIGN PATENT DOCUMENTS

| | | | |
|---|---|---|---|
| CN | 102028402 A | 4/2011 | |
| CN | 201855104 U | 6/2011 | |
| CN | 102599799 A | 7/2012 | |
| CN | 103395565 A | 11/2013 | |
| CN | 205498376 U | 8/2016 | |
| DE | 9203581 U1 | 5/1992 | |
| DE | 20219646 U1 | 3/2003 | |
| EP | 631940 A1 | 1/1995 | |
| EP | 1044889 A1 | 10/2000 | |
| EP | 1057748 A1 | 12/2000 | |
| ES | 2383862 A1 | 6/2012 | |
| GB | 2523797 A | 9/2015 | |
| JP | 19970157380 | 12/1998 | |
| JP | 19980153576 | 11/1999 | |
| JP | 2003024124 A | 1/2003 | |
| JP | 2003144221 A | 5/2003 | |
| JP | 2004337207 A | 12/2004 | |
| JP | 2006042944 A | 2/2006 | |
| JP | 2007313232 A | 12/2007 | |
| JP | 2011254850 A | 12/2011 | |
| JP | 2012070927 A | 4/2012 | |
| JP | 3175589 U | 5/2012 | |
| JP | 2015217158 A | 12/2015 | |
| JP | 20160003528 U | 9/2016 | |
| KR | 200470218 Y1 | 12/2013 | |
| KR | 200483708 Y1 | 6/2017 | |
| WO | 0128886 A1 | 4/2001 | |
| WO | 2005095226 A1 | 10/2005 | |
| WO | 2010100773 A1 | 9/2010 | |
| WO | 2014086092 A1 | 6/2014 | |

OTHER PUBLICATIONS

800ml1600ml Thermos Capacity Portable Vacuum Stew Stainless Steel Beaker Lunch Bento Box Soup Picnic Food Thermos Container Cup [retrieved Nov. 3, 2017], URL: <https://www.aliexpress.com/item/800ml1600ml-Thermos-Capacity-Portable-Vacuum-Stew-Stainless-Steel-Beaker-Lunch-Bento-Box-Soup-Picnic-Food-Thermos/32753576657.html?spm=2114.40010708.4.33.fqgSYz>; 3 color pages, published date unknown but for the purposes of patent prosecution presumably more than a year prior to the filing date of the present application.
Camel Flasks Stainless Steel Lunch Box, 1.8 Liters [online], [retrieved Nov. 3, 2017], Retrieved from the Internet, URL: <http://mudraretail.com/product/camel-flasks-stainless-steel-lunch-box-1-8-liters/>; 3 color pages, published date unknown but for the purposes of patent prosecution presumably more than a year prior to the filing date of the present application.
Flagship Thermos Insulated Stainless Steel Lunch Boxes for Adults 600ml/800ml/1000ml [online], [retrieved Nov. 3, 2017], Retrieved from the Internet, URL: <http://www.globalsources.com/si/AS/zhejiang-Haoqi/6008831883155/pdtl/Flagship-Thermos-Insulated-Stainless-Steel-Lunch-Boxes/1091882260.htm>; 3 color pages, published date unknown but for the purposes of patent prosecution presumably more than a year prior to the filing date of the present application.
Haers 1.7L 2.2L Hot Food Thermos 304 Stainless Steel Insulated Thermal Lunch Box with Spoon Thermos Bento with Food Containers [online], [retrieved Nov. 3, 2017], Retrieved from the Internet, URL: <https://www.aliexpress.com/item/Haers-1-7L-2-2L-Hot-Food-Thermos-Container-304-Stainless-Steel-Insulated-Thermal-Lunch-Box/32558078179.html?spm=2114.40010708.4.34.fqgSYz>; 3 color pages, published date unknown but for the purposes of patent prosecution presumably more than a year prior to the filing date of the present application.
Haers 1500Ml Lunch Box Thermos For Food With Containers Stainless Steel Insulated Food Thermos Lunch Box Hr-1500A-1 [online], [retrieved Nov. 3, 2017], Retrieved from the Internet, URL: <https://www.solidrop.net/product/haers-1500ml-lunch-box-thermos-for-food-with-containers-stainless-steel-insulated-food-thermos-lunch-box-hr-1500a-1.html>; 8 color pages, published date unknown but for the purposes of patent prosecution presumably more than a year prior to the filing date of the present application.
Insulated Lunch Box with Lunch Bag Stainless Steel Food Carrier/Food Container/Taffin Containers Portion Control Containers/Thermos/Indian Tiffin for Hot Food—Hold Warm for 3 Hours, 1.5L [online], [retrieved Nov. 3, 2017], Retrieved from the Internet, URL: <https://www.amazon.com/Insulated-Stainless-Carrier-Container-Containers/dp/B01N11KHMP>; 11 color pages, published date unknown but for the purposes of patent prosecution presumably more than a year prior to the filing date of the present application.
Insulated Stainless Steel Food Canisters (2 sizes) [online], [retrieved Nov. 3, 2017], Retrieved from the Internet, URL: <https://mightynest.com/shop/lunch-gear/food-containers/insulated-food-containers/insulated-stainless steel-food-canisters-2>; 3 color pages, published date unknown but for the purposes of patent prosecution presumably more than a year prior to the filing date of the present application.
Insulated Thermal Bento Lunch Jar Zojirushi Classic [online], [retrieve Nov. 3, 2017], Retrieved from the Internet, URL: <https://casabento.com/shop/en/bento-boxes-zojirushi/369-insulated-thermal-bento-lunch-jar-zojirushi-classic-4974305197511.html>; 4 color pages, published date unknown but for the purposes of patent prosecution presumably more than a year prior to the filing date of the present application.
Kuuk Vacuum Food thermos Lunch Box Container Jar—58oz / 1.8 quart—Stainless Steel [online], [retrieved Nov. 3, 2017], Retrieved from the Internet, URL: <https://www.amazon.com/dp/B01FSTCDC0?psc=1>; 7 color pages, published date unknown but for the purposes of patent prosecution presumably more than a year prior to the filing date of the present application.
Lunch box—Conservation des aliments [online], [retrieve Nov. 3, 2017], Retrieved from the Internet, URL : https://www.boulanger.com/c/boite-de-rangement#message_code=20 <https://www.boulanger.com/c/boite-de-rangement>; 63 color pages, published date unknown but for the purposes of patent prosecution presumably more than a year prior to the filing date of the present application.
Power Plus Stainless Steel Containers Lunch Box, 3-Pieces (H55) [online], [retrieved Nov. 3, 2017], Retrieved from the Internet, URL: <https://www.amazon.in/Power-Plus-Stainless-Containers-3-Pieces/dp/B00IUDUWQ6>; 4 color pages, published date unknown but for the purposes of patent prosecution presumably more than a year prior to the filing date of the present application.
Stainless Steel Vacuum Container, 9 oz. [online], [retrieved Nov. 3, 2017], Retrieved from the Internet, URL: <https://www.llbean.com/llb/shop/79228?feat=506838-GN3&page=stainless-steel-vacuum-container-9-oz&csp=f>; 6 color pages, published date unknown but for the purposes of patent prosecution presumably more than a year prior to the filing date of the present application.
Thermos® 12-Ounce Vacuum-Insulated Food Jar with Microwaveable Container [online], [retrieve Nov. 3, 2017], Retrieved from the Internet, URL: <https://www.bedbathandbeyond.com/store/product/thermos-reg-12-ounce-vacuum-insulated-food-jar-with-microwaveable-container/1041717943>; 2 color pages, published date unknown but for the purposes of patent prosecution presumably more than a year prior to the filing date of the present application.
Vacuum Insulated Lunch Box, Thermal Insulating Stainless Steel Lunch Containers, 2.0L (0.53Gal) [online], [retrieved Nov. 3, 2017], Retrieved from the Internet, URL: <https://www.mylifeunit.com/Vacuum-Insulated-Lunch-Box-Thermal- Insulating-Stainless-Steel-Lunch-Containers-2.0L-0.53Gal>; 12 color pages, published date unknown but for the purposes of patent prosecution presumably more than a year prior to the filing date of the present application.
Vaya Tyffyn 1000 ml Insulated Lunch Box w.Bag Mat—Stainless Steel Leak-Resistant Food Storage Container—100% BPA Free, Eco-Friendly & Reusable Lunch Box 23.5 oz (4.2 cups) total

(56) References Cited

OTHER PUBLICATIONS capacity [online], [retrieved Nov. 3, 2017], Retrieved from the Internet, URL: <https://www.amazon.com/dp/B06WGPLKG1?psc=1>; 8 color pages, published date unknown, but for purposes of patent prosecution presumably more than a year prior to the filing date of the present application.

Zojirushi 101 vol. 79, Sep. 2015 [online], [retrieved Nov. 3, 2017], Retrieved from the Internet, URL: <http://www.zojirushi.com/mailmagazine/back_issue/101toppage_sep15.html>; 6 color pages, published date unknown but for the purposes of patent prosecution presumably more than a year prior to the filing date of the present application.

Zojirushi SL-JAE14SA Mr. Bento Stainless Steel Lunch Jar, Silver [online], [retrieved Nov. 3, 2017], Retrieved from the Internet, URL: <https://www.amazon.com/dp/B000246GSE/ref=psdc_2457292011_t1_B06WGPLKG1>; 9 color pages, published date unknown but for the purposes of patent prosecution presumably more than a year prior to the filing date of the present application.

Yeti. Drinkware. 2019. <URL:https://www.yeti.com/en US/drinkware>. (Year: 2019).

Yeti. Accessories. 2019. <URL:https://www.yeti.com/en_US/accessories/for-rambler>. (Year: 2019).

MonBento Insulated Bento Box: Site Visited [Jul. 19, 2019]. Available from internet URL: <https://www.lunchaporter.com/en/all-products/lunch-containers/monbento-element-insulated-bento-box.html>.

Plastic Jar | posted at uline.com, no posting date, (c)—1996-2019 Uline.com, [online], [site visited Jun. 5, 2017]. Available from Internet, <https://www.uline.com/Product/Detail/S-9935B-W/Jars/Clear-Round-Wide-Mouth-Plastic-Jars-Bulk-Pack-8-oz-White-Cap> (Year: 2019).

* cited by examiner

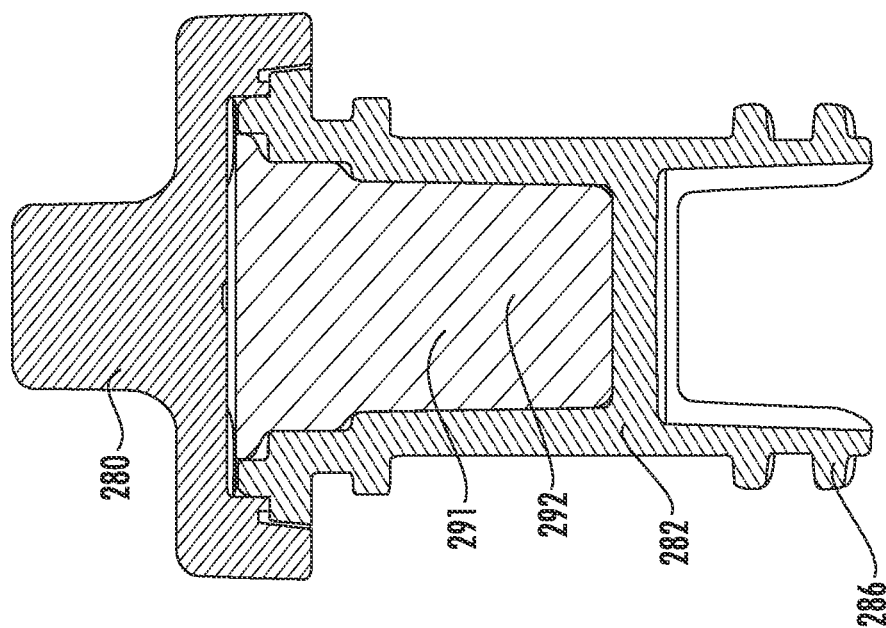
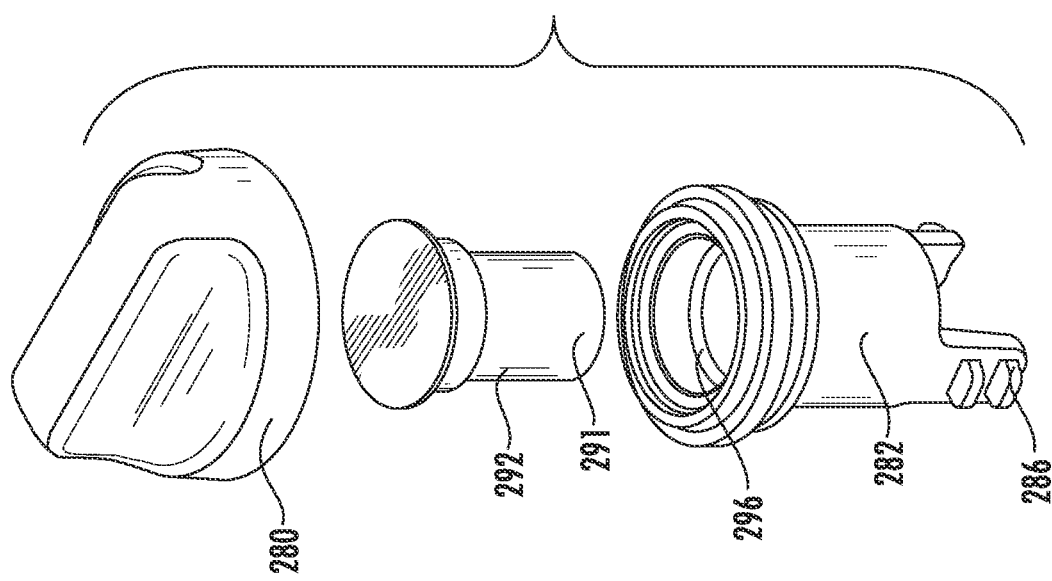

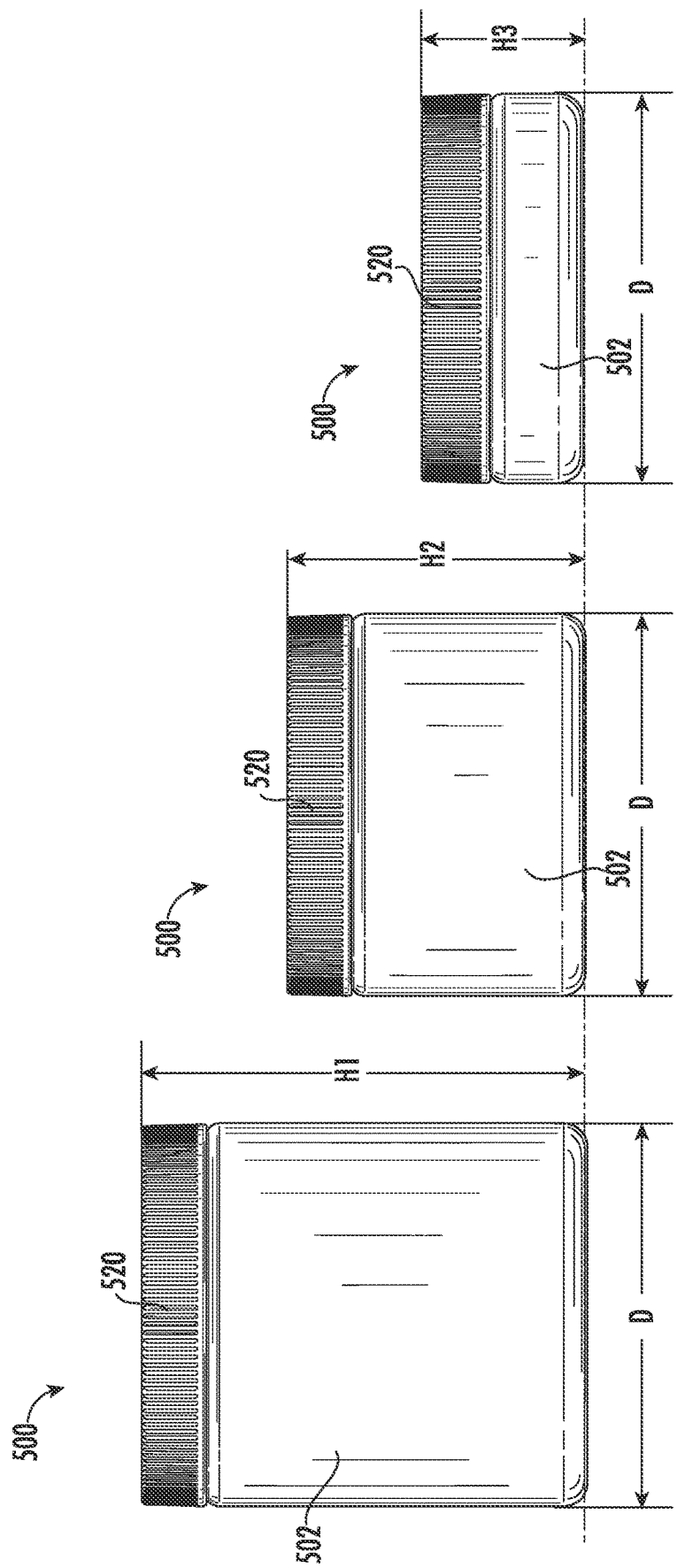

CONTAINER AND LID

CROSS-REFERENCE TO RELATED APPLICATIONS

This application is a continuation of U.S. patent application Ser. No. 15/590,452 filed Apr. 11, 2018, which claims priority to U.S. Provisional Application 62/546,767 filed on Aug. 17, 2017. The above referenced application is hereby incorporated by reference in its entirety.

BACKGROUND

A container may be configured to store a volume of liquid, food, or any other item. In one example, an opening in the container may be sealed with a removable cap. Depending upon the items stored in the container, in some situations, the internal pressure within the container may become very high.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to one aspect, certain containers including insulated containers are disclosed and according to other aspects container kits or container systems are disclosed.

According to one aspect, an insulating container is disclosed. The insulating container includes a canister comprising: a sidewall structure having a first end and a second end, the first end configured to support the canister on a surface, and the first end comprising a base handle; an opening in the second end extending through the sidewall structure; and a neck structure encircling the opening and extending in an axial direction. The insulating container also includes a multi-part lid adapted to seal the opening, the multi-part lid comprising: an upper lid portion having a top surface and a handle extending from the top surface; a lower lid portion having a threaded sidewall configured to be received into the neck structure; an insulating puck engaged between the upper lid portion and the lower lid portion; a bottom lid cap engaged with a bottom end of the lower portion; a vent opening extending through each of the upper lid portion, the insulating puck, the lower lid portion, and the bottom lid cap; and a removable vent plug configured to vent air through the vent opening. The vent opening comprises a threaded cylindrical inner wall configured to interface with a threaded outer surface of the vent plug; and the vent plug is rotatable between a first closed position, a second venting position, and a third disengaged position.

The sidewall structure may comprise a sealed vacuum cavity between an inner wall and an outer wall. The first end of the canister may comprise at least one recess forming the base handle. The first end of the canister may comprise two D-shaped recesses forming the base handle. The base handle may be substantially rectangular.

The first end may comprise a lower cap engaged with the sidewall structure. The engagement between the lower cap and the sidewall structure may be substantially seamless.

The upper lid portion and the lower lid portion may be engaged using mechanical fasteners. The lower lid portion may comprise a strengthening wall structure. The strengthening wall structure forms a honeycomb pattern of interconnected hexagonal prisms. The strengthening wall structure may be taller at a center than at an outer wall of the lower lid portion.

The vent plug may further comprise an upper knob portion and a lower engagement portion, the lower engagement portion including a first arm and a second arm. The vent plug may further comprise an insulating plug in an internal cavity of the lower engagement portion. The threaded cylindrical inner wall of the vent opening may further comprise at least one retaining lug. The threaded cylindrical inner wall of the vent opening may further comprise at least one closed position retaining lug and at least one venting position retaining lug.

The multi-part lid and the vent plug may be magnetically attracted to each other.

According to another aspect, this disclosure provides an insulating container. The insulating container may include a canister comprising: a sidewall structure having a first end and a second end, the first end configured to support the canister on a surface, and the first end comprising a base handle; an opening in the second end extending through the sidewall structure; and a neck structure encircling the opening and extending in an axial direction. The insulating container may also include lid adapted to seal the opening. The sidewall structure may comprise a sealed vacuum cavity between an inner wall and an outer wall; and the first end of the canister may comprise at least one recess forming the base handle.

The first end of the canister may comprise two D-shaped recesses forming the base handle. The base handle may be substantially rectangular.

The first end may comprise a lower cap engaged with the sidewall structure and wherein the engagement between the lower cap and the sidewall structure may be substantially seamless.

According to another aspect, this disclosure provides, an insulating container. The insulating container includes a canister comprising: a sidewall structure having a first end and a second end, the first end configured to support the canister on a surface; an opening in the second end extending through the sidewall structure; and a neck structure encircling the opening and extending in an axial direction. The insulating container also includes a multi-part lid adapted to seal the opening, the multi-part lid comprising: an upper lid portion; and a lower lid portion having a threaded sidewall configured to be received into the neck structure. The upper lid portion and the lower lid portion are engaged using mechanical fasteners.

The insulating container may further comprise an insulating puck engaged between the upper lid portion and the lower lid portion. The insulating container may further comprise a bottom lid cap engaged with the lower portion, the bottom lid cap covering the mechanical fasteners. The insulating container may further comprise a vent opening extending through each of the upper lid portion, and the lower lid portion. The insulating container may further comprise a vent configured to vent air through the vent opening, wherein the vent is movable between a first closed position, a second venting position, and a third disengaged position. The vent may comprise a removable vent plug.

According to another aspect this disclosure provides a container. The container includes a canister comprising: a substantially cylindrical sidewall having a top end and a bottom end, wherein the bottom end is configured to support the canister on a surface, and includes a domed surface; an opening in the top end forming a storage portion, and an engaging portion on an outer surface of the cylindrical sidewall near the top end. The container also includes a lid adapted to seal the opening, the lid comprising: a top surface having a lip along a peripheral edge of the top surface, wherein the lip is above the top surface, a sidewall adjacent the lip at a top end and extending to a bottom edge at a bottom end; an opening extending through the bottom end of the lid, an interior base surface opposite the top surface, a substantially cylindrical wall extending downward from the interior base surface forming a groove between the cylindrical wall and the sidewall; and a gasket having a upper surface and a lower surface positioned within the groove such that when the lid is attached to the canister, the gasket is in contact with both the lid and the canister.

The top surface of the lid may comprise at least one recess forming a handle. The top surface of the lid may comprise two D-shaped recesses forming the handle.

The substantially cylindrical wall may have a gap. The gasket further may further comprise a tab extending inward toward a center of the gasket into the gap in the substantially cylindrical wall. A portion of the tab may be co-planar to a bottom surface of the gasket. The tab on the gasket may extend through the gap in the substantially cylindrical wall. The gasket may comprise at least one channel extending along at least one of a top surface or a bottom surface of the gasket.

In another aspect this disclosure provides a container kit. The container kit may include an insulating container, comprising: a canister comprising: a sidewall structure having a first end and a second end, the first end configured to support the canister on a surface, and the first end comprising a base handle; an opening in the second end extending through the sidewall structure forming a storage portion; and a neck structure encircling the opening and extending in an axial direction; and a lid adapted to seal the opening. The sidewall structure comprises a sealed vacuum cavity between an inner wall and an outer wall; and the first end of the canister comprises at least one recess forming the base handle. The container kit may also include a plurality of inner containers positioned within the storage portion of the insulated container, wherein each of the inner containers comprises: a canister comprising: a substantially cylindrical sidewall having a top end and a bottom end, the bottom end comprising a domed surface; an opening in the top end extending through the sidewall structure forming a second storage portion; and an engaging portion on an outer surface of the cylindrical sidewall near the top end; a lid adapted to seal the opening, the lid comprising: a top surface having a lip along a peripheral edge of the top surface, wherein the lip is above the top surface, a sidewall adjacent the lip at a top end and extending to a bottom edge at the bottom end; an opening extending through the bottom end, and an interior base surface opposite the top surface, a substantially cylindrical wall extending from the interior base surface forming a groove between the cylindrical wall and the sidewall structure; and a substantially cylindrical gasket having a upper surface and a lower surface positioned within the groove such that when the lid is attached to the canister, the gasket is in contact with both the lid and the canister.

The top surface of the lid of each of the plurality of inner containers may comprise at least one recess forming a handle. The top surface of the lid of each of the plurality of inner containers may comprise two D-shaped recesses forming the handle.

The inner wall of the insulating container may have a first diameter and an outer surface of the inner container has a second diameter, wherein the first diameter is greater than the second diameter.

The plurality of inner containers may comprise a first inner container having a first height and a second inner container having a second height, wherein the first height is greater than the second height. The plurality of inner containers may comprise three inner containers. The plurality of inner containers may comprise a single first inner container and a two second inner containers.

According to another aspect, this disclosure provides, a container kit. The container kit may include an insulating container comprising: a canister comprising: a sidewall structure having a first end and a second end, the first end configured to support the canister on a surface; an opening in the second end extending through the sidewall structure forming a storage portion; and a neck structure encircling the opening and extending in an axial direction; a multi-part lid adapted to seal the opening, the multi-part lid comprising: an upper lid portion; and a lower lid portion having a threaded sidewall configured to be received into the neck structure. The upper lid portion and the lower lid portion are engaged using mechanical fasteners. The container kit may also include at least one inner container positioned within the storage portion of the insulated container, wherein the at least one inner container comprises: a canister comprising: a substantially cylindrical sidewall having a top end and a bottom end; an opening in the top end extending through the sidewall forming a storage portion; and an engaging portion on an outer surface of the cylindrical sidewall near the top end; a lid adapted to seal the opening, the lid comprising: a top surface having a lip along a peripheral edge of the top surface, wherein the lip is above the top surface, a sidewall adjacent the lip at a top end and extending to a bottom edge at the bottom end; an opening extending through the bottom end, and an interior base surface opposite the top surface.

The at least one inner container may be a single inner container.

The lid may further comprise a substantially cylindrical wall extends from the interior base surface forming a groove between the cylindrical wall and the sidewall structure, and wherein a substantially cylindrical gasket having a upper surface and a lower surface positioned within the groove such that when the lid is attached to the canister, the gasket is in contact with both the lid and the canister. The at least one inner container may comprise two inner containers, wherein each of the inner containers have different heights. The two inner containers may comprise a first inner container that is stacked on top of a second inner container.

BRIEF DESCRIPTION OF THE DRAWINGS

The present invention is illustrated by way of example and not limited in the accompanying figures in which like reference numerals indicate similar elements and in which:

FIG. 12A depicts an exploded isometric view of a vent plug, according to one or more aspects described herein.

FIG. 12B depicts a side cross-sectional view of a vent plug, according to one or more aspects described herein.

FIGS. 17A-17C depict embodiments of inner containers, according to one or more aspects described herein.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

In general, aspects of this invention relate to containers, container systems, canisters, lids, and canisters with lids. According to various aspects and embodiments, the containers and lids may be formed of one or more of a variety of materials, such as metals (including metal alloys), polymers, and composites, and may be formed in one of a variety of configurations, without departing from the scope of the invention. It is understood that the containers and lids may contain components made of several different materials. Additionally, the components may be formed by various forming methods. For example, metal components, may be formed by forging, molding, casting, stamping, machining, and/or other known techniques. Additionally, polymer components, such as elastomers, can be manufactured by polymer processing techniques, such as various molding and casting techniques and/or other known techniques.

The various figures in this application illustrate examples of canisters and lids according to this invention. When the same reference number appears in more than one drawing, that reference number is used consistently in this specification and the drawings refer to the same or similar parts throughout.

Figure 1A:
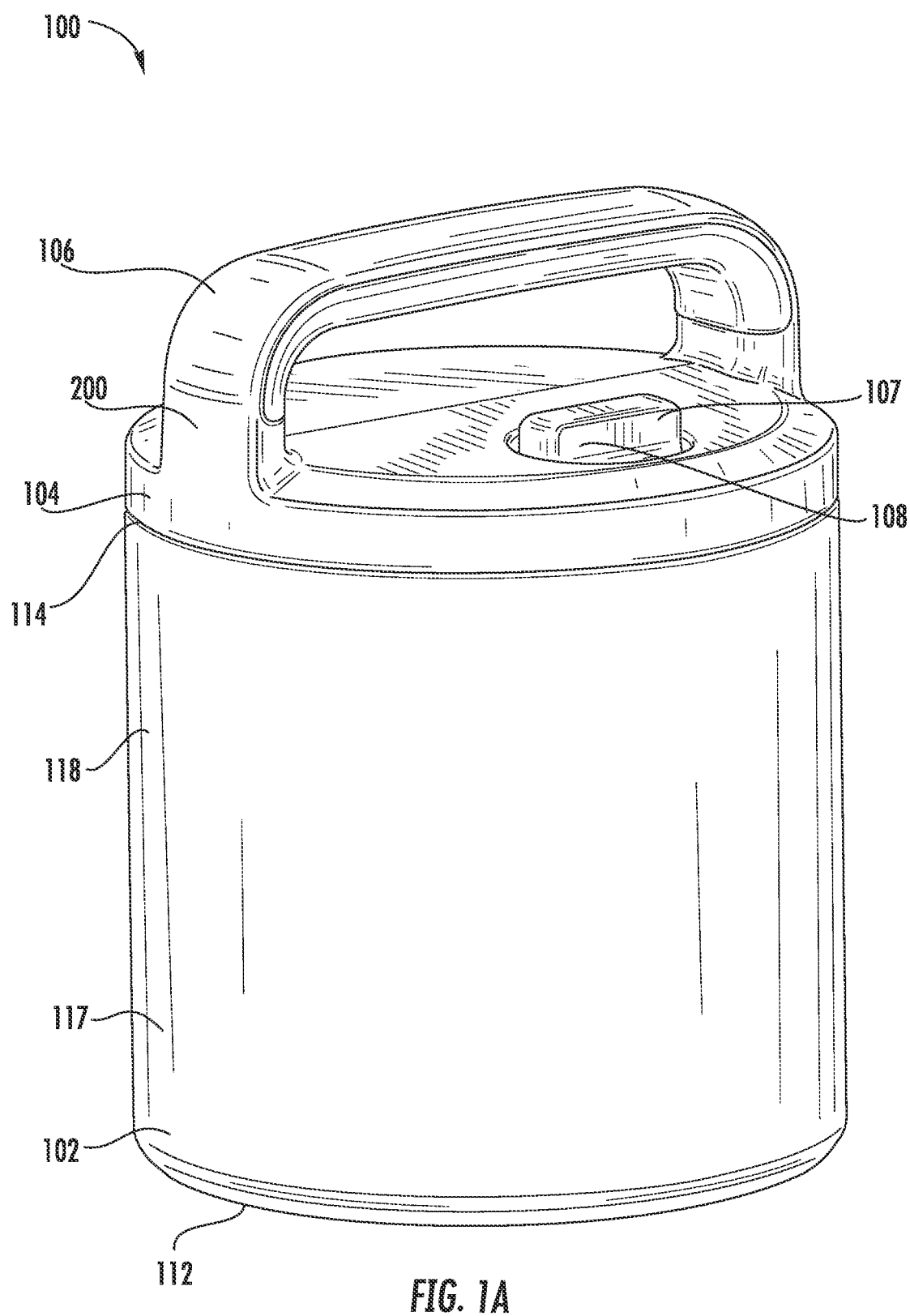
FIG. 1A depicts an isometric view of an example container, according to one or more aspects described herein.
Figure 1B:
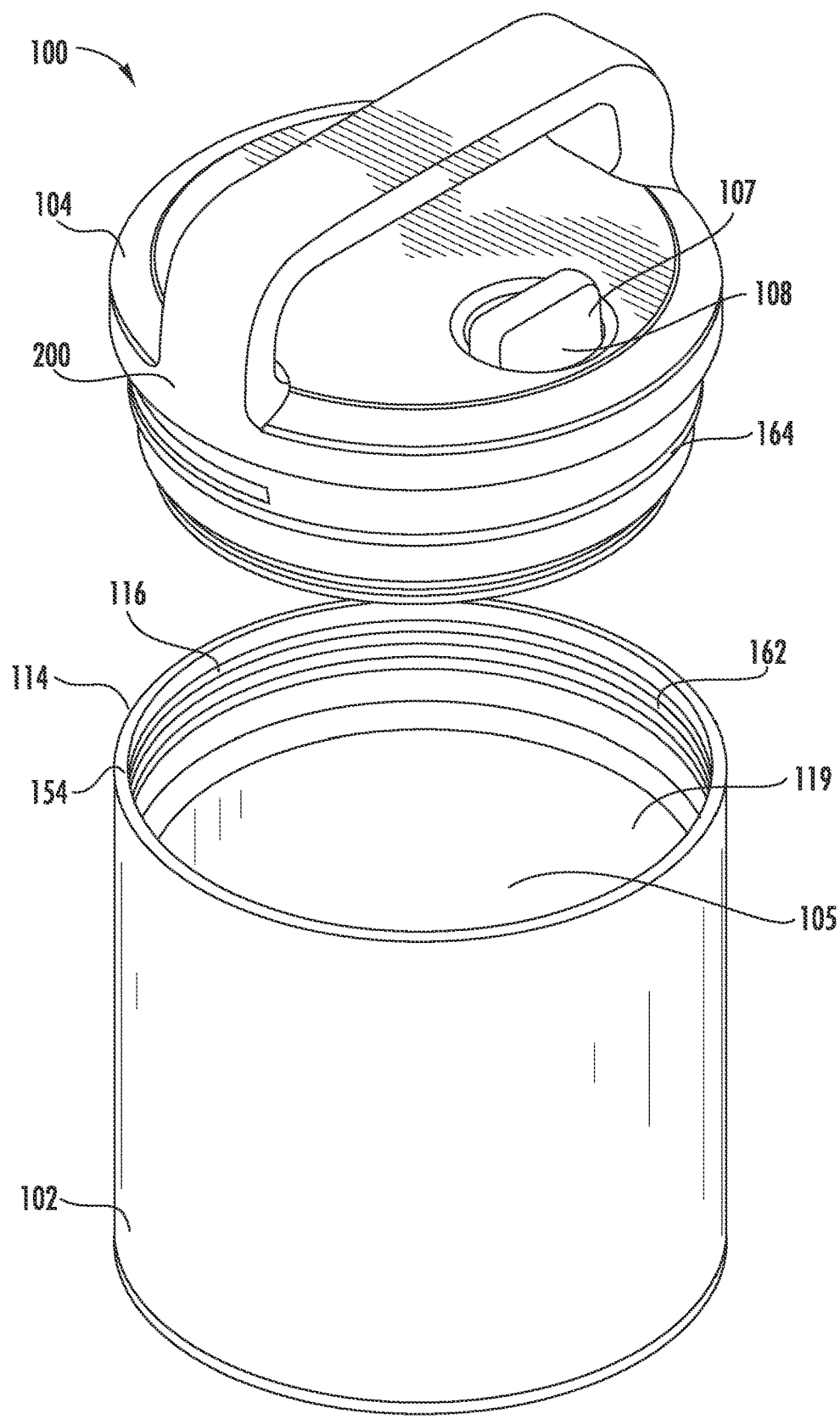
FIG. 1B depicts an exploded isometric view of the container of FIG. 1A, according to one or more aspects described herein.
Figure 1C:
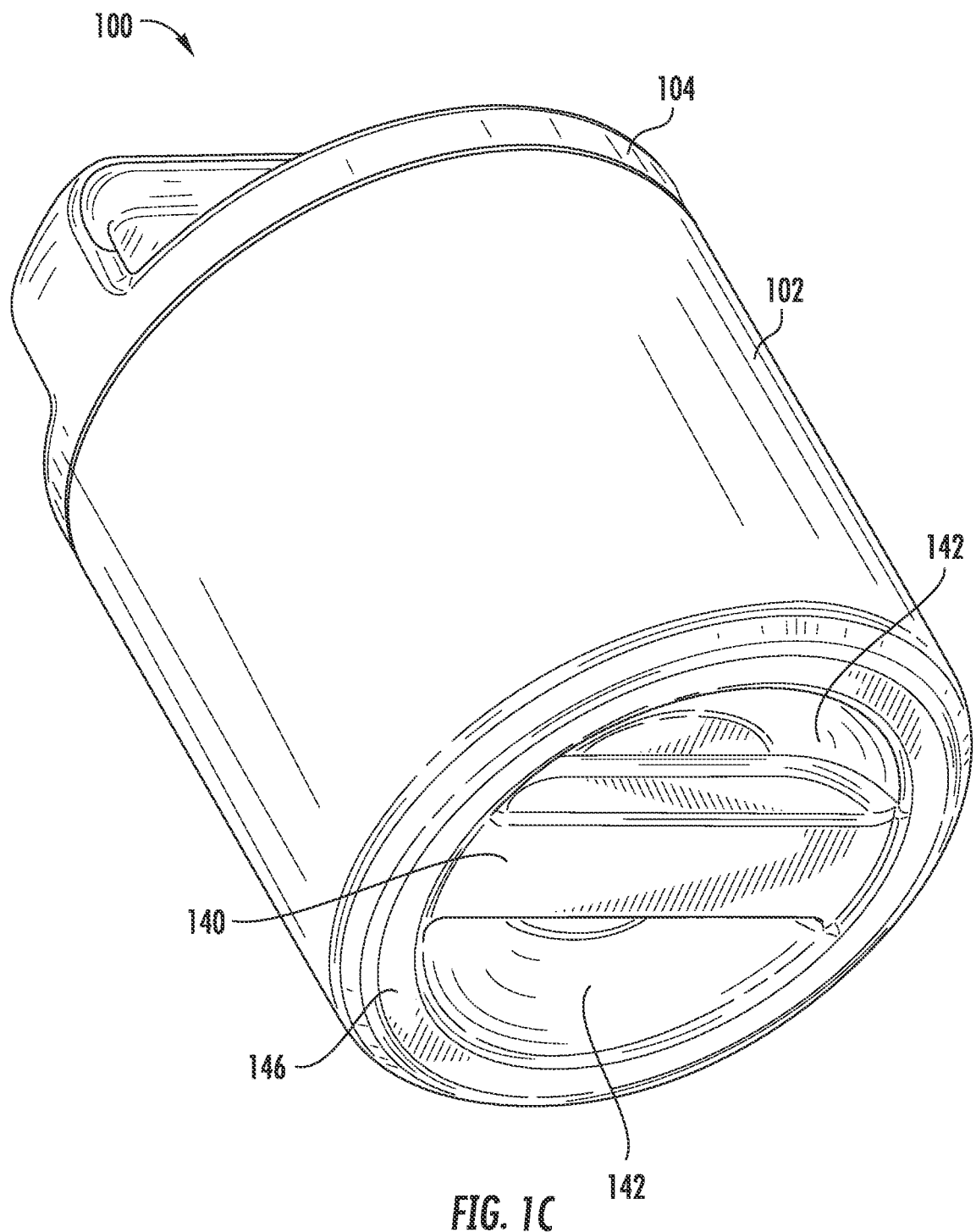
FIG. 1C depicts a bottom isometric view of the container of FIG. 1A, according to one or more aspects described herein.
Figure 1E:
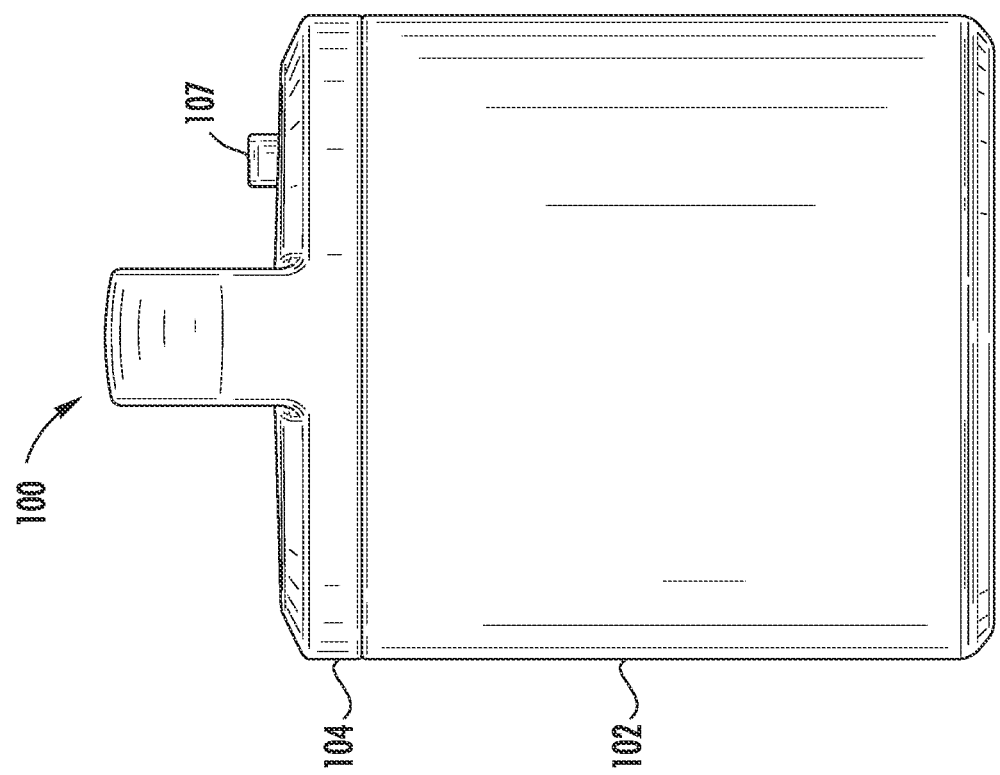
FIG. 1E depicts a side view of the container of FIG. 1A, according to one or more aspects described herein.
Figure 1D:
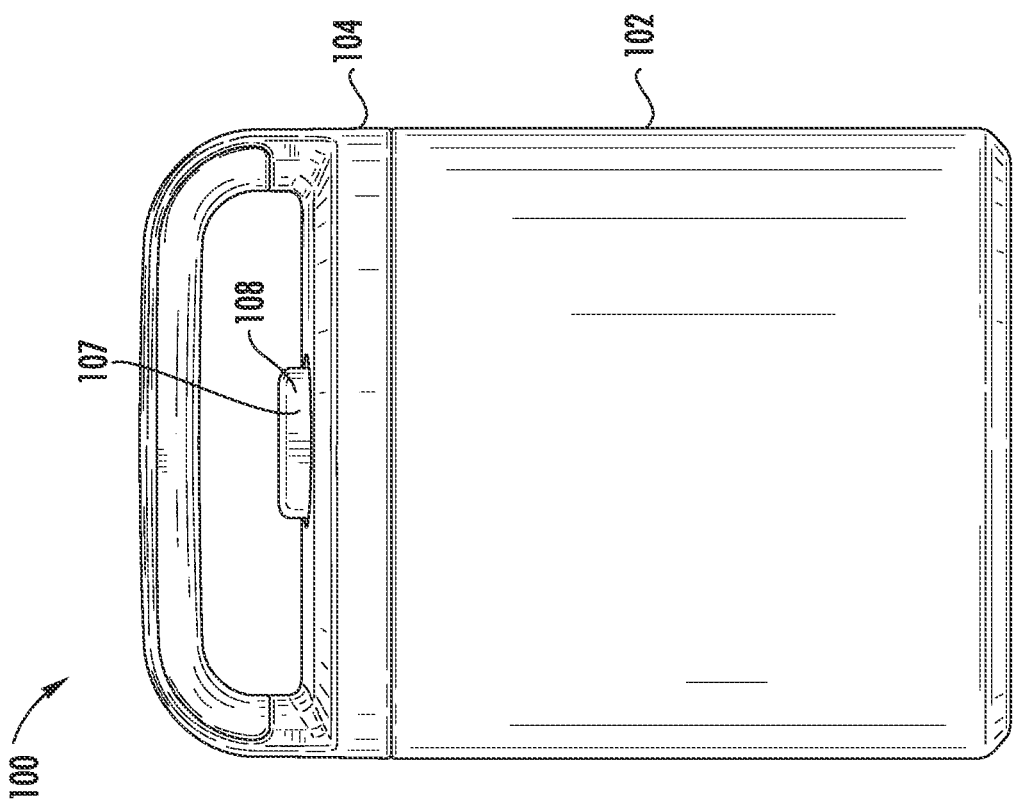
FIG. 1D depicts a front view of the container of FIG. 1A, according to one or more aspects described herein.
Figure 1G:
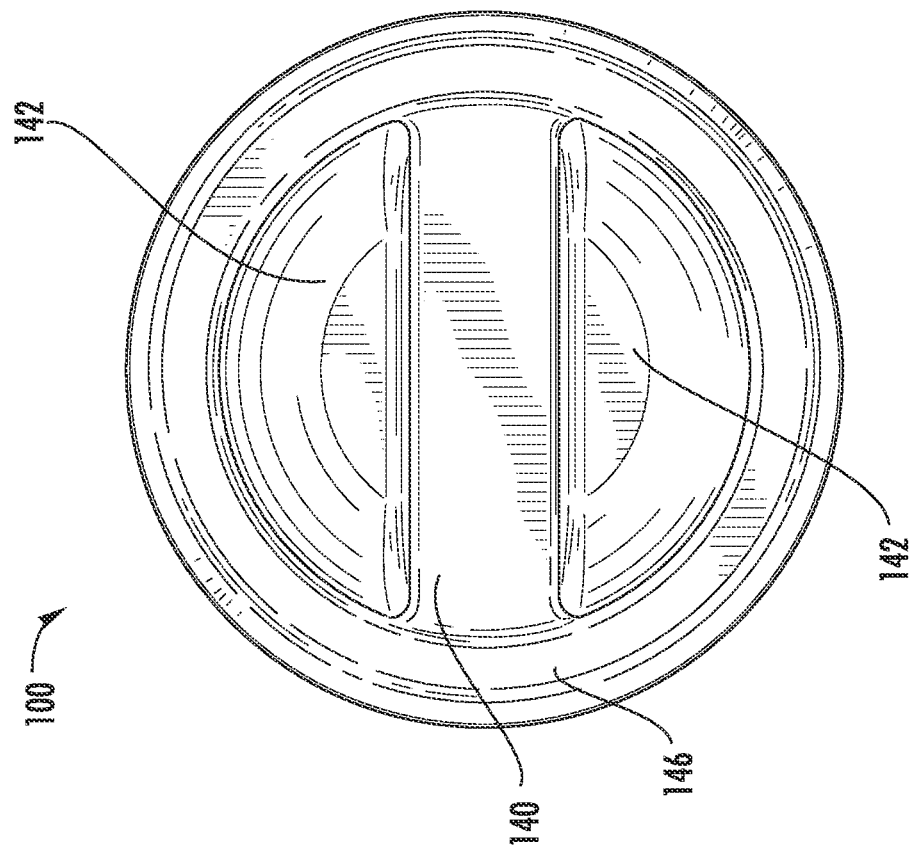
FIG. 1G depicts bottom view of the container of FIG. 1A, according to one or more aspects described herein.
Figure 1F:
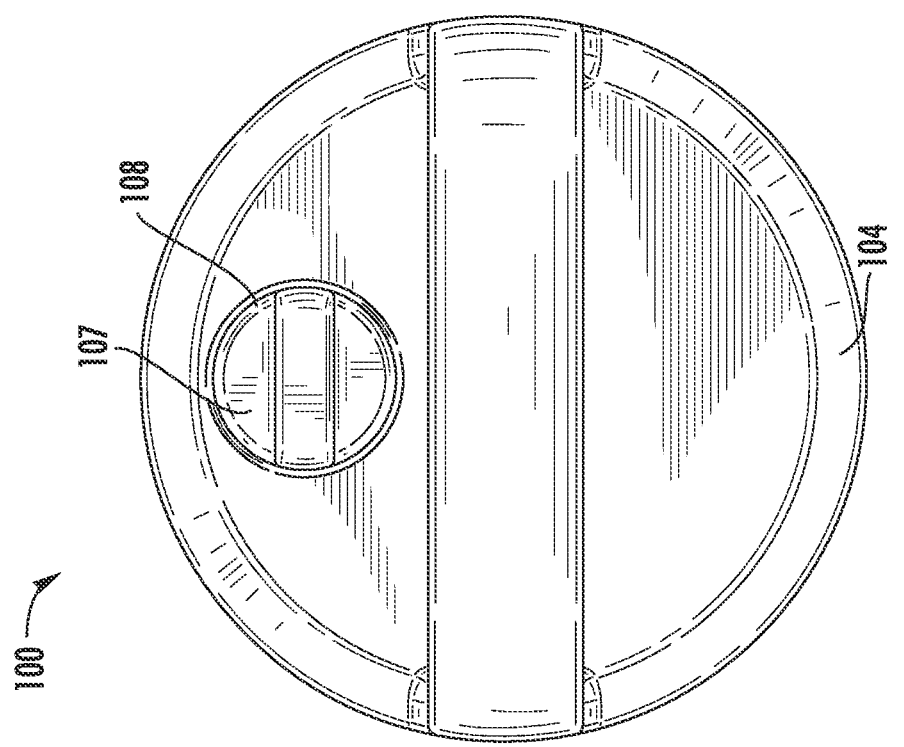
FIG. 1F depicts a top view of the container of FIG. 1A, according to one or more aspects described herein.

FIGS. 1A-1G depict various views of a container 100. In one example, container 100 may comprise a bottom portion 102 having a lid 104 removably coupled thereto. In one example, the bottom portion 102 may be substantially cylindrical in shape. In various examples, bottom portion 102 may be referred to as a canister 102, or base 102. The bottom portion 102 may, alternatively, be referred to as an insulated base structure having a substantially cylindrical shape, and having an opening 116 in one end 114 as shown in FIG. 1C. The opening 116 may allow access to the storage portion 105 of the container 100. In another example to that implementation depicted in FIGS. 1A-1G, the bottom portion 102 may be substantially cuboidal, or prismoidal (e.g. a pentagonal prism, hexagonal prism, heptagonal prism, among others) in shape. In one implementation, and as shown in FIG. 1A, the lid 104 may comprise a handle structure 106.

In various examples, the lid 104 may comprise a vent 107. The vent 107 may be configured to allow air pressure in the storage portion 105 of the container to equalize with ambient air pressure. For example, air may be allowed to vent or escape from inside of the container 100 to outside of the container 100 through the vent 107. In some embodiments the vent may automatically activate and allow air to exit the container if a predetermined air pressure is reached inside the container. In other examples, the vent 107 may be manually be activated by a user. In one example, the vent 107 may be a vent plug 108 as shown in FIG. 1. The vent plug 108 may be configured to removably couple to, and seal (i.e. resealably seal), an opening 110 (or lid opening) in the lid 104 as shown in FIG. 1A. As will be discussed in greater detail below, the vent plug 108 may be rotated between a closed position, a venting position, and a disengaged position.

In one example, the canister 102 may be configured to store a volume of liquid or food in the storage area 105. In one implementation, the canister 102 may be configured to store approximately 24.2 ounces of a liquid and in another implementation may be configured to store approximately 40.4 ounces of a liquid. In another implementation, the canister 102 may be configured to store at least approximately 20 ounces, at least approximately 30 ounces, at least approximately 40 ounces, at least approximately 50 ounces, at least approximately 80 ounces, at least approximately 100 ounces, or at least approximately 120 ounces of a liquid, among others.

Turning again to FIG. 1A, in various examples, the canister 102 may comprise a first end 112 forming a base configured to support the canister 102 on an external surface. In one example, for the implementation of container 100 having a substantially cylindrical bottom portion 102 (canister 102), the first end 112 may have a substantially circular shape. The canister 102 may comprise a second end 114 having an opening 116 therein, as depicted in FIG. 1B. Further, the first end 112 and the second end 114 may be separated by a curved outer sidewall structure 117 forming a substantially cylindrical shape of the canister 102. In one implementation, the opening 116 may be configured to allow a liquid or food to be introduced into, or removed from the canister 102.

In one implementation, container 100 (or insulating container) may include one or more insulating elements configured to reduce a rate of heat transfer to or from a material stored within the container. In one example, the canister 102 may be configured with a vacuum-sealed insulating structure, otherwise referred to as a vacuum-sealed double wall structure, or an insulated double wall structure. In such an embodiment the sidewall structure 117 may have an outer sidewall 118 and an inner sidewall 119 and may be sealed such that a vacuum is maintained between the inner wall 119 and an outer wall 118 of the canister 102. In one implementation, a sealed cavity 120 may be sandwiched between the inner wall 119 and the outer wall 118. As best shown in the cross-sectional view of FIG. 3, the sealed cavity 120 may extend around all sides and below the storage portion 105 of the canister 102. As shown, the inner wall 119 may form the entire inside of the canister 102 and the outer wall 118 may form the entire outside of the canister 102 sidewall structure 117. The walls 118, 119 may engage each other at the top end 114 and may also engage each other at a lower portion 123 or bottom end 112.

The sealed cavity 120 may be a vacuum cavity in some embodiments. In other examples, specific implementations of insulating structures that utilize one or more vacuum chambers to reduce heat transfer by conduction, convection and/or radiation may be utilized within canister 102, without departing from the disclosures described herein. In another implementation, container 100 may include an insulated double wall comprising an inner wall 119 and an outer wall 118. In one example, a cavity 120 between the inner wall 178 and the outer wall 118 may be filled with air to form an air pocket. In another example, the cavity 180 may be filled with an insulating material, such as an insulating foam (e.g. polystyrene).

In one example, the combination of the inner wall 119 and the outer wall 118 may be referred to as an insulated wall. In one implementation, the first end 112, the second end 114, and/or sidewall structure 117 may comprise a vacuum-sealed insulated wall between the inner wall 119 and the outer wall 118. Further, a surface of one or more of the inner wall 119 or the outer wall 118 may comprise a silvered surface configured to reduce heat transfer by radiation.

Figure 3:
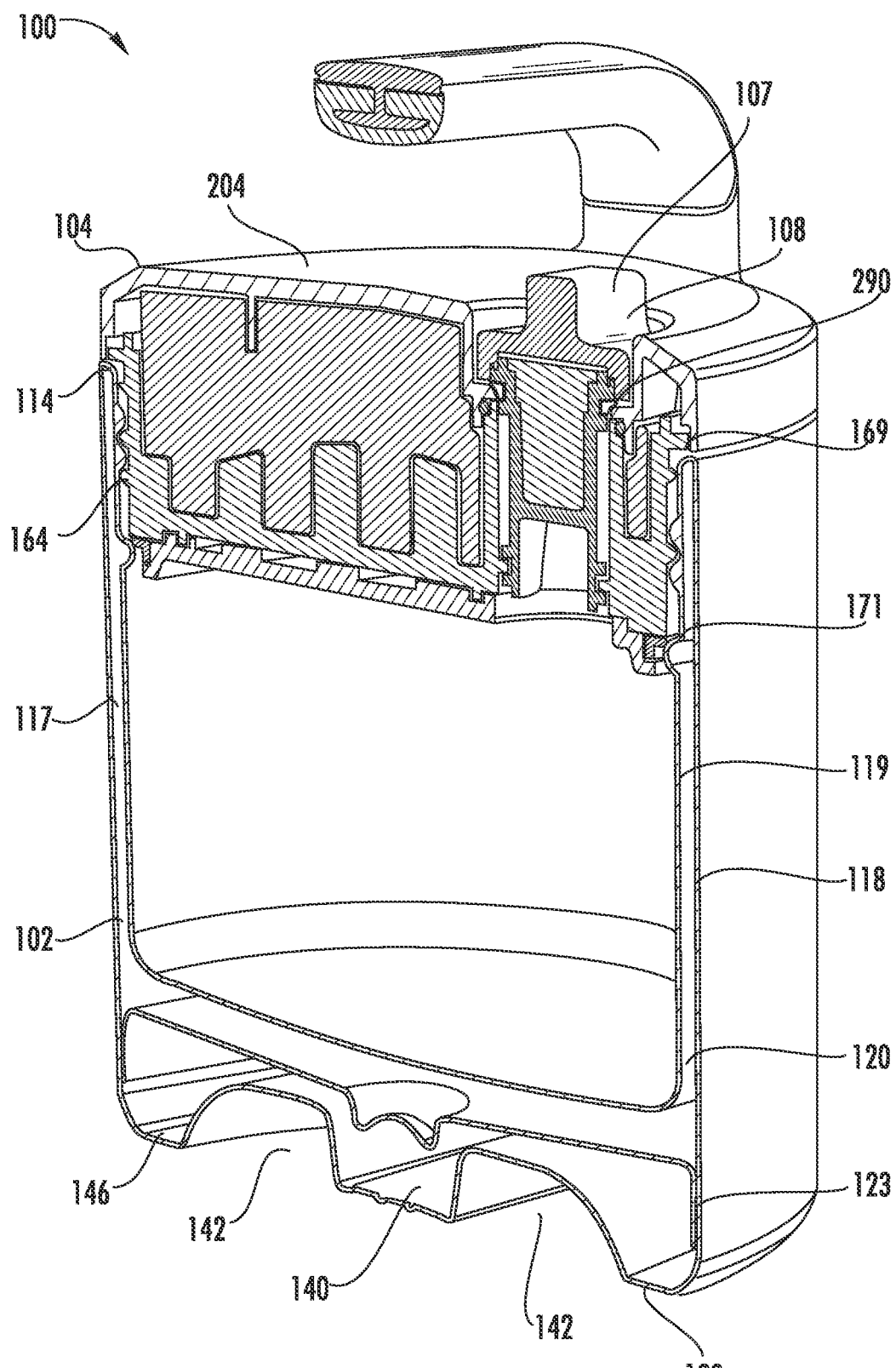
FIG. 3 depicts an isometric cross-sectional view of a container, according to one or more aspects described herein.
Figure 4:
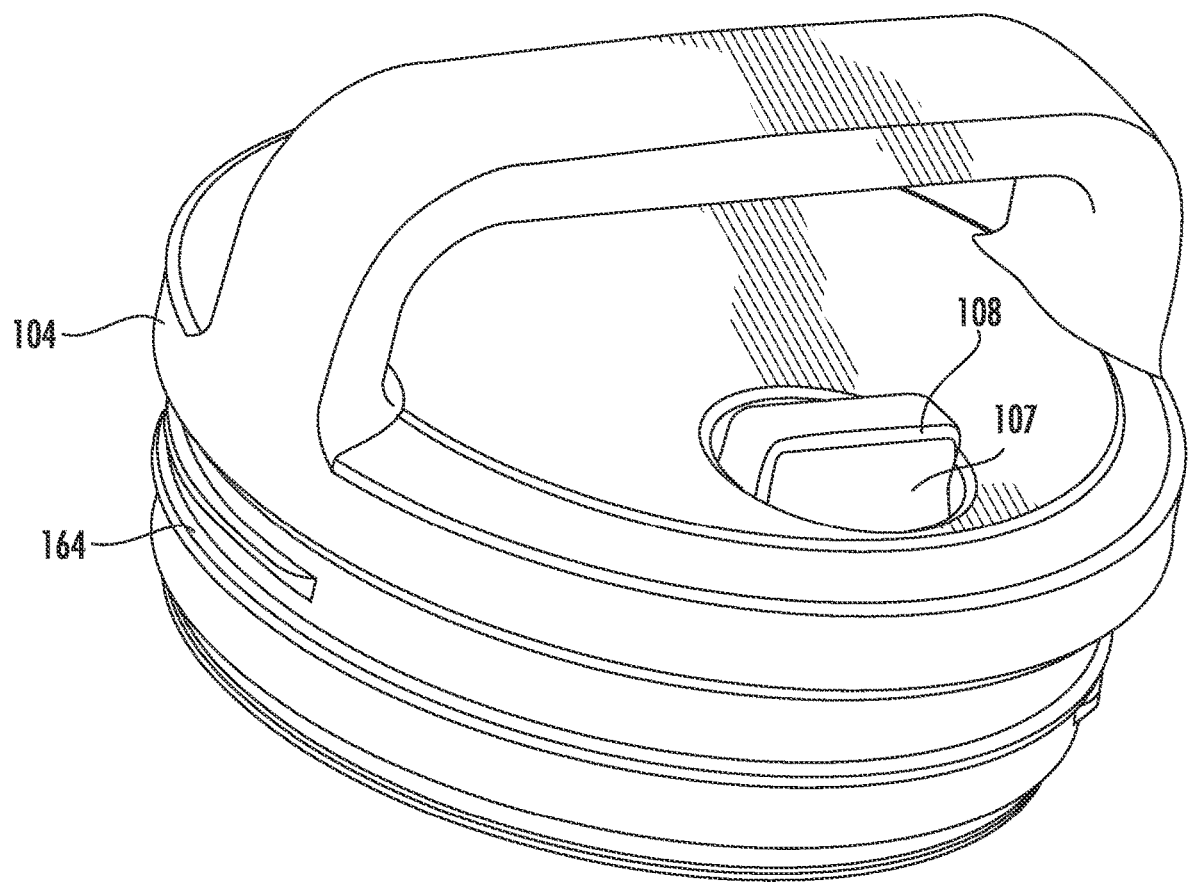
FIG. 4 depicts an isometric view of a lid, according to one or more aspects described herein.

In some embodiments, the bottom of the canister 102 or first end 112 may comprise a base handle 140. As best shown in FIG. 1C and FIG. 3, the base handle 140 may be formed by one or more recesses 142 in the first end 112 of the canister 102. As shown in FIG. 1C, each of the recesses 142 may be generally D-shaped and may form a generally rectangular base handle 140. The first end 112 may also include an outer perimeter portion 146 forming an outer circle around the handle 140 and recesses 142. As shown in FIG. 1C, the lower edges of the handle 140 and outer perimeter 146 may taper inward towards the deeper portions of the recesses 142. In other embodiments, the recesses 142 may have different shapes which may form a different shaped handle 140. Advantageously the lower handle 140 is configured to be gripped by a user and may aid the user in opening the container 100. For example, the user may be able to grip both the handle 106 and the base handle 140 and this may allow for easier opening of the container 100.

Figure 2:
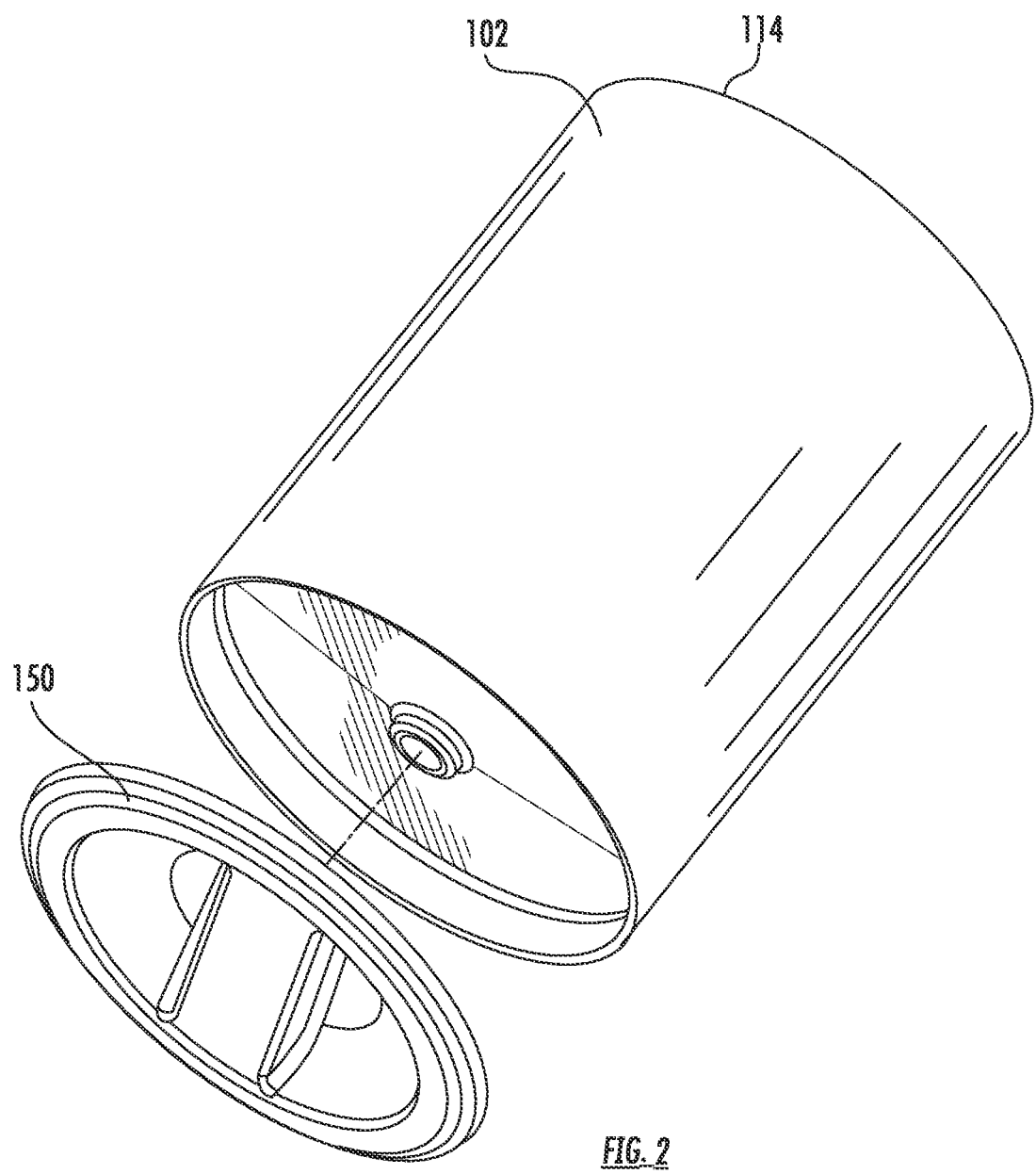
FIG. 2 depicts a bottom isometric view of a portions of a container, according to one or more aspects described herein.

As shown in FIG. 2, the bottom portion or first end 112 of the canister 102 may be formed separately from the canister 102. As shown in FIG. 2, the first end 112 of the canister comprises a lower cap 150. The lower cap may be fastened to the outer wall 118, inner wall 119, or both the combined outer wall 118 and inner wall 119 as shown in FIG. 3. The lower cap 150 may be fastened to the outer wall 118 and/or inner wall 119 such that the engagement between outer wall 118 and/or inner wall 119 and the lower cap 150 is substantially seamless.

In one example, the canister 102 may be constructed from one or more metals, alloys, polymers, ceramics, or fiber-reinforced materials. Additionally, canister 102 may be constructed using one or more hot or cold working processes (e.g. stamping, casting, molding, drilling, grinding, forging, among others). In one implementation, the canister 102 may be constructed using a stainless steel. In one specific example, the canister 102 may be formed substantially of 304 stainless steel. In one implementation, one or more cold working processes utilized to form the geometry of the canister 102 may result in the canister 102 being magnetic (may be attracted to a magnet).

The canister 102 may also include a neck structure 154. In one implementation, the lid 104 may be configured to removably couple to the neck structure 154 of the canister 102. As such, the neck structure 154 may encircle the opening 116 in the canister 102, and extend out from the canister 102 in a substantially axial direction. As shown in FIG. 1B, the neck structure 154 may have the same outer diameter as the other portions of the canister 102, but in other embodiments it may have an outer diameter different than the outer diameter of the other portions of the canister 102. As will be discussed in greater detail below the neck structure 154 may include threads 162 on the inner wall 119 which may be used to engage the lid 104.

In various examples, the canister 102 may be embodied with different geometries. For example, container 100 may be embodied with a base portion, similar to canister 102, having a non-cylindrical shape. In particular, container 100 may have a base, similar to canister 102, having a substantially cuboidal, spherical, or prismoidal shape, or combinations thereof, among others, without departing from the scope of the disclosures described herein. As such, container 100 may have a base portion, similar to canister 102, having a non-cylindrical shape, but maintaining a substantially cylindrical neck structure 154, configured to be removably coupled to a substantially cylindrical lid 104. In yet another implementation, an opening, similar to opening 116, and a neck structure, similar to neck structure 120, may have non-circular geometries, without departing from the scope of the disclosures described herein. Additionally or alternatively, a lid of container 100, similar to lid 104, may have a non-circular shape, without departing from the scope of the disclosures described herein. For example, a lid of container 100 or container 300, similar to lid 104, may have a substantially cuboidal, spherical, or prismoidal shape, or combinations thereof, among others, without departing from the scope of the disclosures described herein.

As best shown in FIG. 1B and FIG. 3, a cross-sectional view of one implementation of the container 100, the lid 104 may be removably coupled to the canister 102 using a threaded fastening mechanism. Accordingly, in one implementation, the neck structure 154 may have a threaded inner surface 162 on the inner wall 119. In this way, the threaded inner surface 162 may be configured to interface with a threaded outer wall 164 of the lid 104.

Additional or alternative coupling mechanisms may be utilized to removably couple the lid 104 to the canister 102, without departing from the scope of the disclosures described herein. For example, the neck structure 154 may be embodied with a threaded outer surface and configured to interface with a corresponding threaded structure on the lid 104.

In one example, a connection mechanism configured to removably couple the lid 104 to the canister 102 may be designed such that the coupling is fully engaged upon rotation of the lid 104 relative to the canister 102 by any number of revolutions, or by any fraction of a revolution. For example, the lid 104 may be fully engaged with the canister 102 upon placing the lid 104 on the neck structure 120, and rotating the lid 104 by approximately ¼ of one full revolution, approximately ⅓ of one full revolution, approximately ½ of one full revolution, approximately 1 full revolution, approximately 2 full revolutions, approximately 3 full revolutions, at least 1 revolution, or at least five revolutions, among many others.

In one implementation, a removable coupling between the lid 104 and the canister 102 may comprise one or more gaskets configured to seal the coupling such that, in one example, liquid may not escape from the canister 102 while the removable coupling between the lid 104 and the canister 102 is engaged. As shown, for example, in FIG. 3, the removable coupling between the lid 104 and the canister 102 may comprise an upper gasket 169 and a lower gasket 171.

In some embodiments, the lid 104 may be a multi-part lid 104 adapted to seal the opening 116. FIGS. 5A-5E show portions of a multi-part lid 104 one example of how a multi-part lid 104 may be assembled. The multi-part lid 104 may comprise an upper lid portion 202 having a top surface 204 and a handle 106 extending from the top surface 204. The multi-part lid 104 may also include a lower lid portion 210 having a threaded sidewall 164 configured to be received into the neck structure 154. The multi-part lid 104 may also include insulation portion 219 between the upper lid portion 202 and the lower lid portion 210. In some embodiments, the insulation portion 219 may be air or may be vacuum sealed. In other examples, the insulation portion 219 may be a polymer foam, such as polystyrene. In still other embodiments, the insulation portion 219 may comprise an insulating puck 220 engaged between the upper lid portion 202 and the lower lid portion 210. The insulating puck 202 may substantially mimic the internal dimensions of the cavity formed between the upper and lower portions. The multi-part lid 104 may also include a bottom cap 224 (or bottom lid cap). Additionally, as will be discussed in greater detail below, the multi-part lid 104 may also include an opening 110 extending through the upper portion 202, the lower portion 210, the insulating portion 219, and/or the bottom cap 224 which can be used in conjunction with the vent 107 or vent plug 108 to vent air as described above.

Figure 5C:
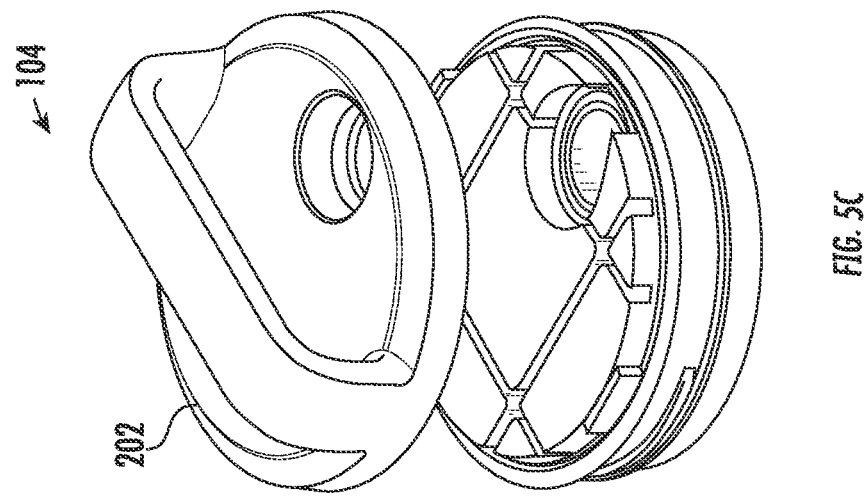
FIGS. 5A-5E depict exploded isometric views of portions of a lid, according to one or more aspects described herein.

As shown in FIGS. 5A-5E, the lower lid portion 210 may include an outer wall 250 forming an outer boundary of the lower lid 210 and connecting to a bottom wall 252. The outer portion of the bottom wall 252 may include a recessed portion 254 that recesses generally upward. As shown in FIG. 6, the lower lid portion 210 may include a plurality of strengthening walls 256 (or strengthening wall structure) extending upward from the bottom wall 252 and extending inward from the outer wall 250. The strengthening walls 256 may form a grid-like pattern having recesses 258 between the strengthening walls 256. As shown in FIG. 6, the strengthening walls 256 may be arranged in a honeycomb type pattern of interconnected shaped structures. As shown in FIG. 6, these interconnected shaped structures may be hexagonally shaped forming hexagonal prisms. In other embodiments, the interconnected shaped structures may be cuboidal, or prismoidal (e.g. a pentagonal prism, heptagonal prism, among others).

Figure 10:
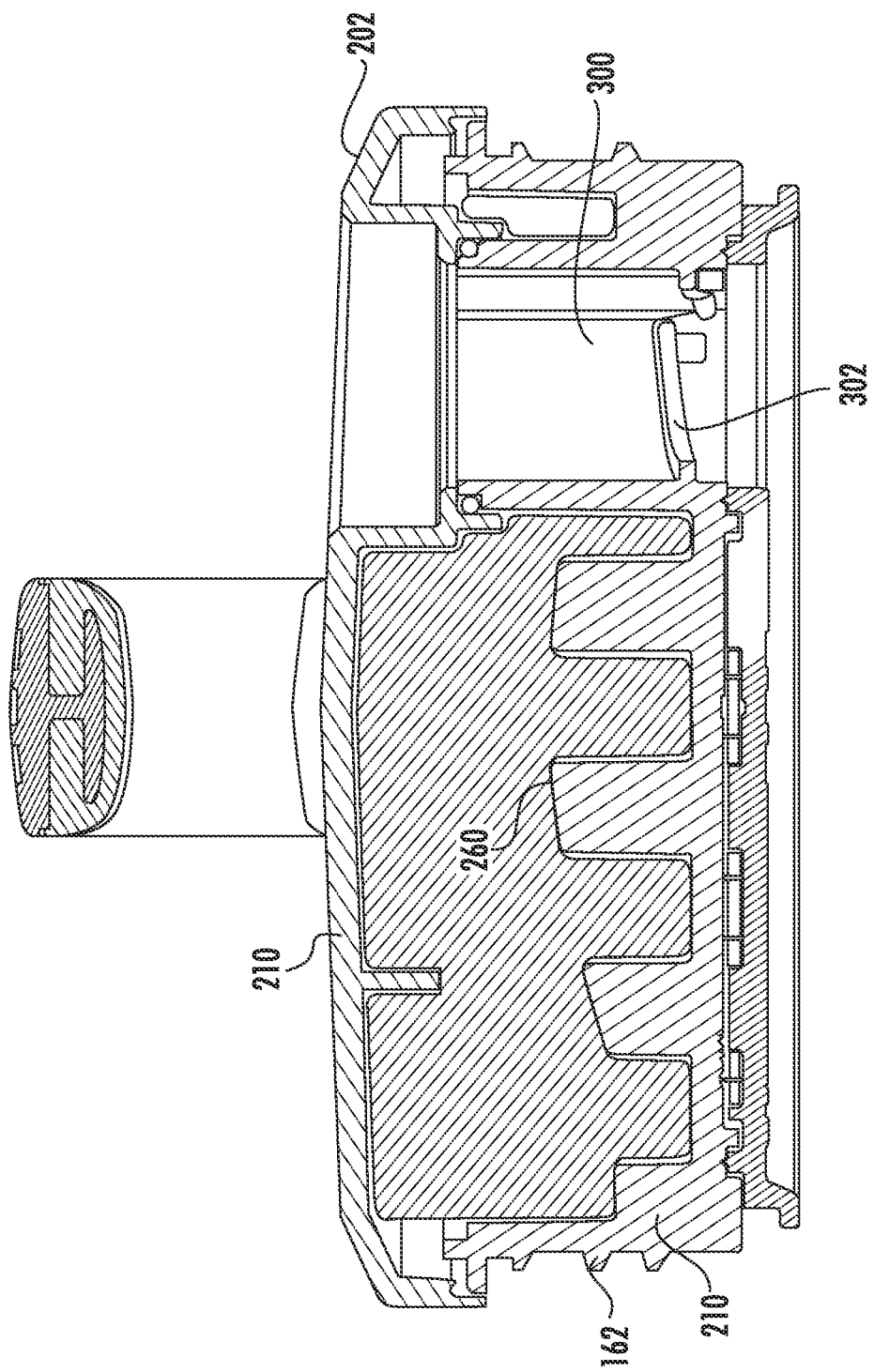
FIG. 10 depicts a side cross-sectional view of a lid, according to one or more aspects described herein.

The strengthening walls 256 may provide additional strength to the lid 104. In some embodiments, as best shown in cross-sectional views of FIGS. 3 and 10, the strengthening walls 256 (or strengthening wall structure) may have an upper edge 260 that generally forms a dome shape such that the strengthening walls 256 toward a center portion of the lid 104 are taller than strengthening walls 256 towards the outer wall 250 of the lower lid portion 210. This may provide additional strength towards the center of the lid 104.

Figure 7:
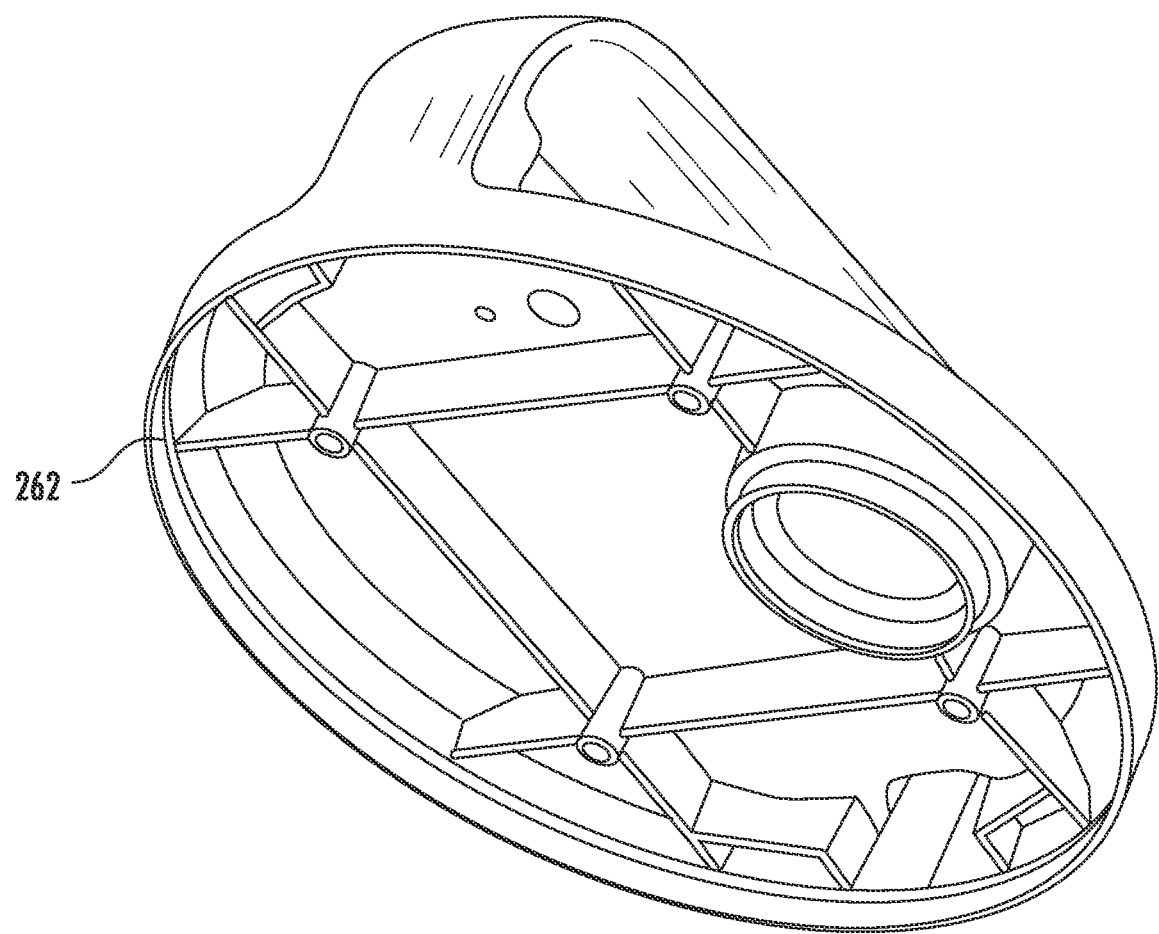
FIG. 7 depicts an isometric view of a portion of a lid, according to one or more aspects described herein.

As shown in FIG. 7 the upper lid portion 202 may similarly include one or more strengthening walls 262 (or strengthening wall structure).

Figure 5B:
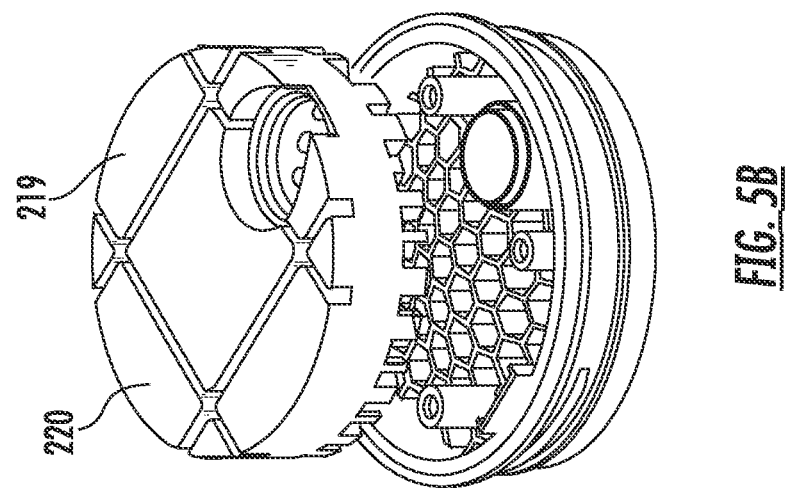
Figure 5A:
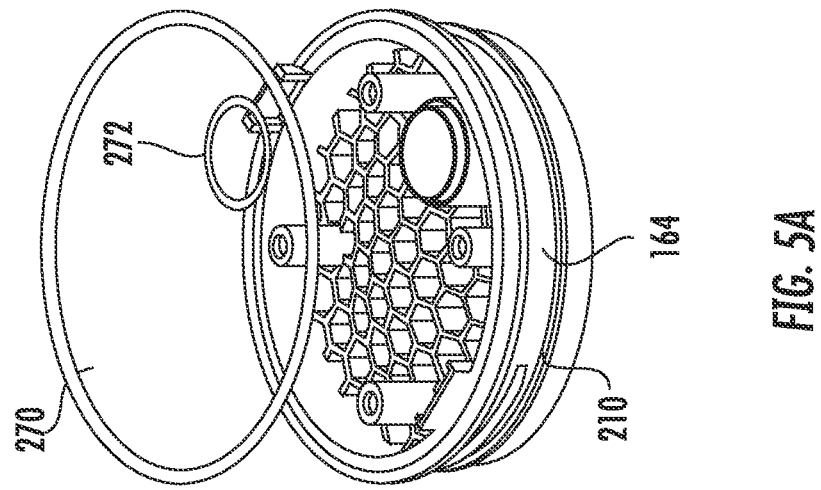
Figure 6:
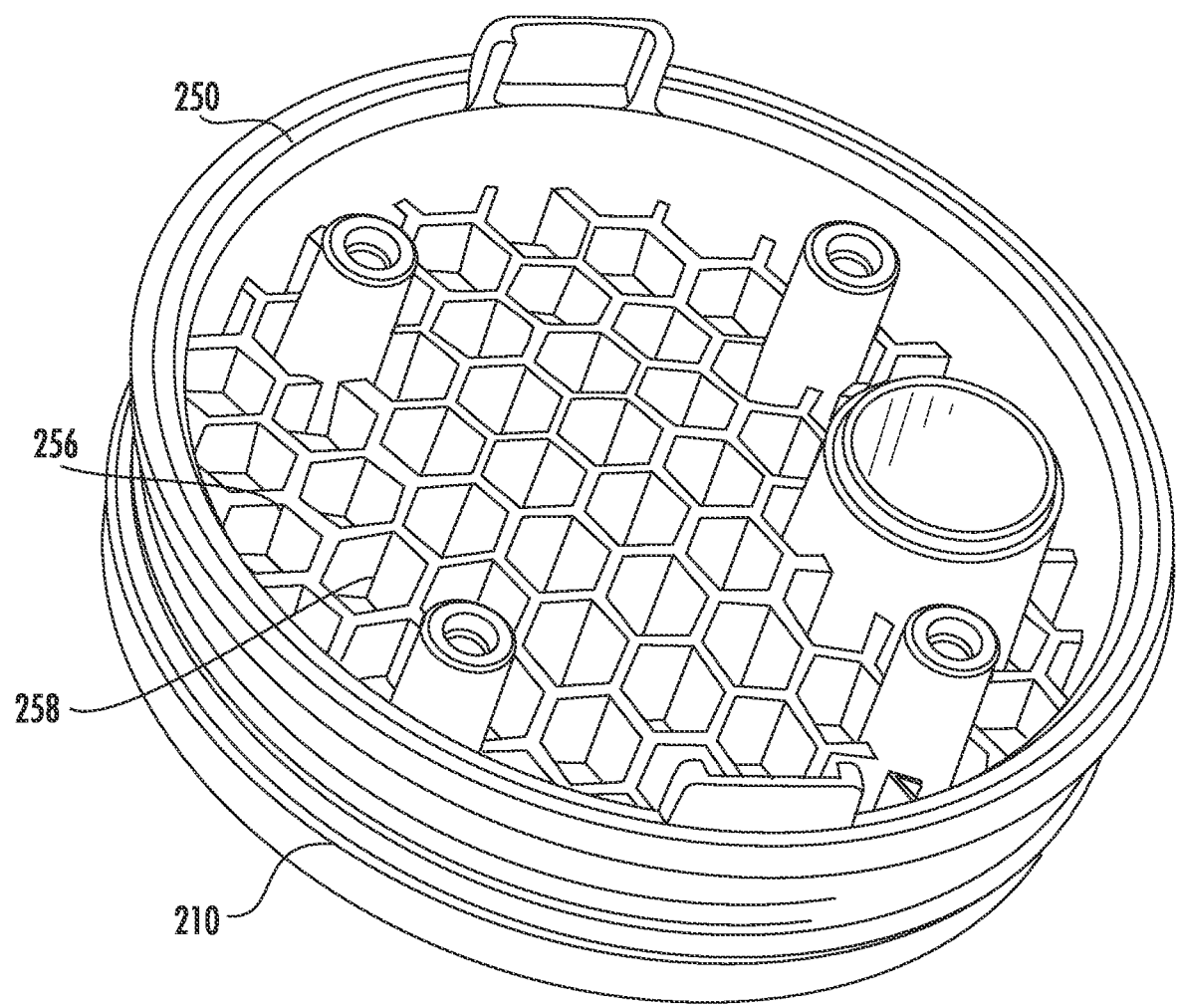
FIG. 6 depicts an isometric view of a portion of a lid, according to one or more aspects described herein.
Figure 8A:
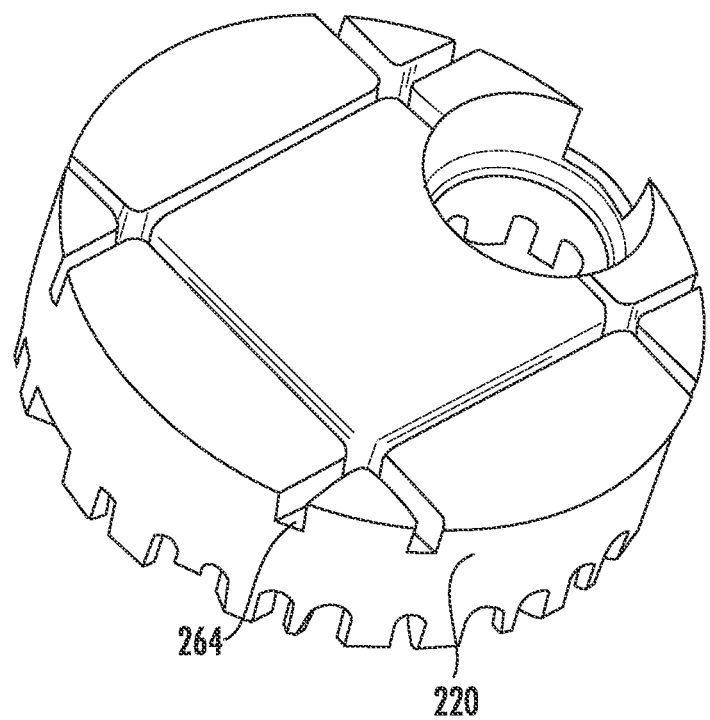
FIGS. 8A and 8B depict isometric views of a portion of a lid, according to one or more aspects described herein.
Figure 8B:
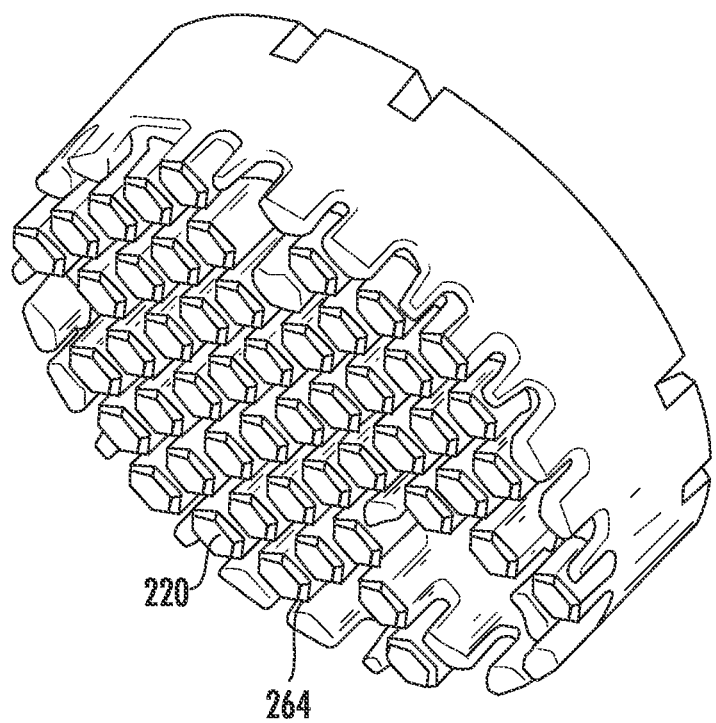

As shown in FIG. 5B, the insulating puck 220 may be configured to be engaged in a cavity created by the upper lid portion 202 and the lower lid portion 210. As shown in FIGS. 8A and 8B, the insulating puck 220 may include a number of channels 264. The channels 264 may correspond to strengthening walls 256, 262 such that the insulating puck 220 may fill substantially all of the open space between the upper lid portion 202 and the lower lid portion 210.

Figure 5E:
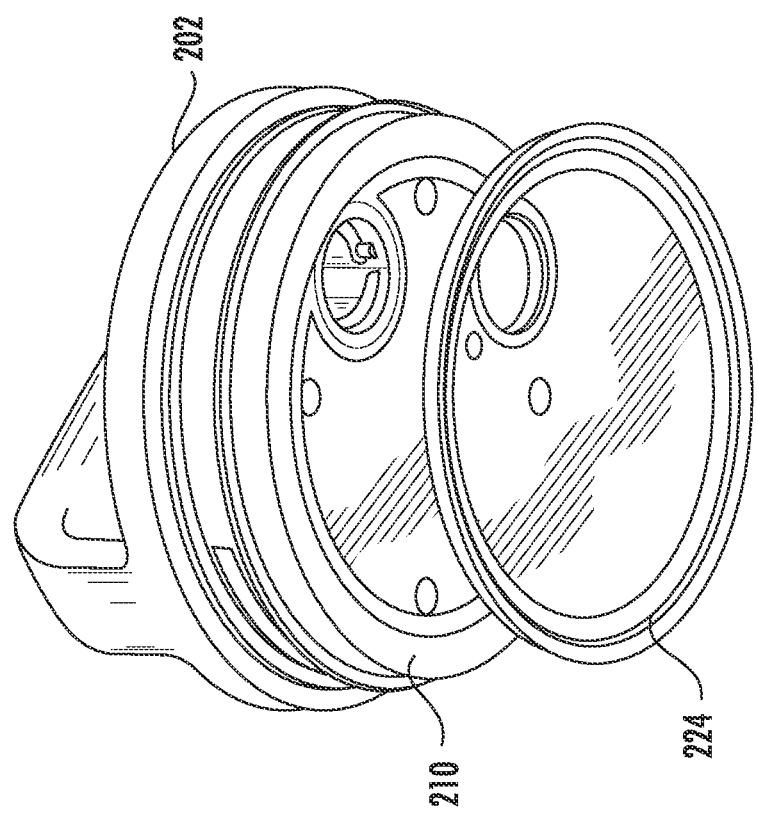
Figure 5D:
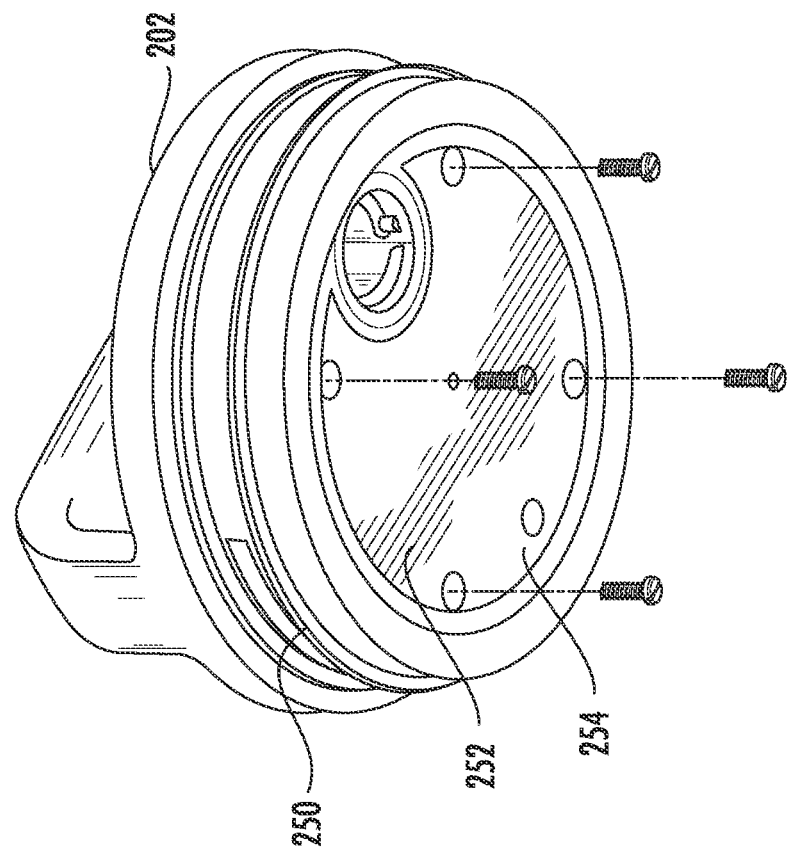

As shown in FIG. 5C-5D, the upper lid portion 202 may be engaged with the lower lid portion 210 with the insulation portion 219 or insulating puck 220 sandwiched between the two portions. The multi-part lid 104 may also include one or more gaskets 270, 272 at locations where the upper lid portion 202 and the lower lid portion 210 contact each other. These gaskets 270, 272 may prevent or restrict liquid from entering the cavity formed between the upper lid portion 202 and the lower lid portion 210 and/or from contacting the insulating puck 220.

The upper lid portion 202 may be fastened to the lower lid portion 210 (including with the insulation portion 219 or the insulating puck 220 and gaskets 270, 272 between the portions) using mechanical fasteners 274 as shown in FIG. 5E. Although screws are shown in FIG. 5E, other mechanical fasteners can be used to engage the upper lid portion 202 and the lower lid portion 210 including, for example, snap fit connections and press fit connections. Additionally, in some examples the portions 202 and 210 may be fastened together using adhesives and/or welding.

Figure 9:
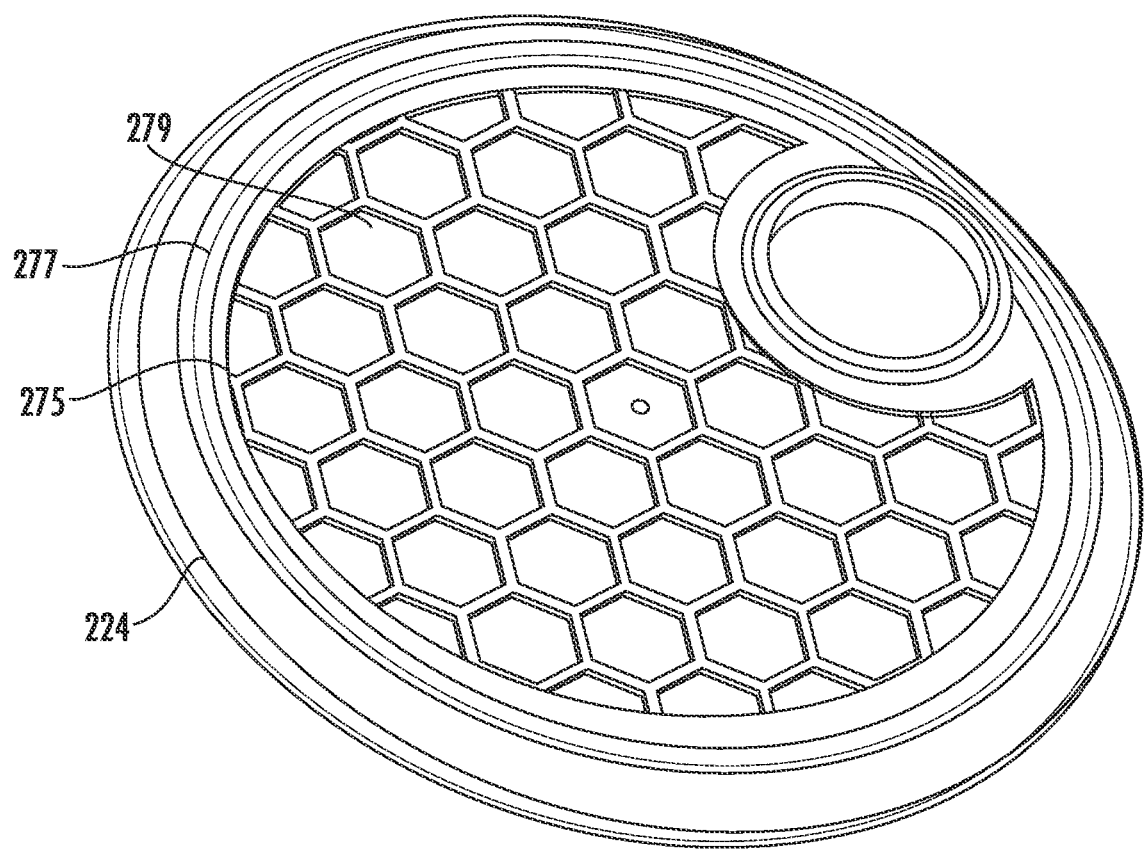
FIG. 9 depicts an isometric view of a portion of a lid, according to one or more aspects described herein.

As shown in FIG. 5E, the bottom cap 224 (or bottom lid cap) may be engaged with the lower portion 210 such that the mechanical fasteners are covered. The bottom lid cap 224 may be attached to the lower portion 210 through ultrasonic welding or other suitable methods. As shown in FIG. 9, the bottom lid cap 224 may include a raised portion 275 which may be configured to fit within the recessed portion 254 of the lower portion 210. The raised portion 275 may include a raised outer wall 277 which may be substantially circular. Inside of the raised outer wall 277, the raised portion 275 may include a raised wall structure 279. As shown in FIG. 9, the raised wall structure 279 may be arranged in a honeycomb type pattern of interconnected shaped structures. As shown in FIG. 9, these interconnected shaped structures may be hexagonally shaped forming hexagonal prisms. In other embodiments the interconnected shaped structures may be cuboidal, or prismoidal (e.g. a pentagonal prism, heptagonal prism, among others).

Figure 11:
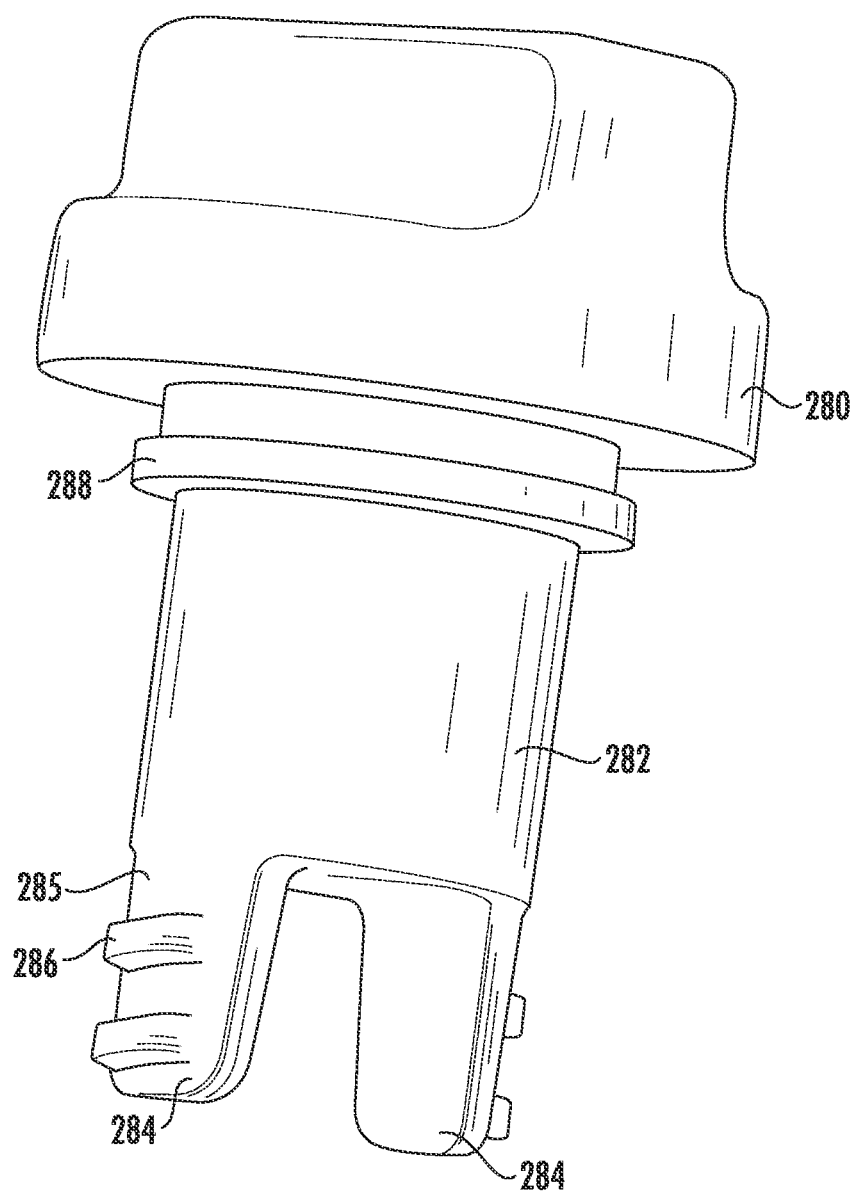
FIG. 11 depicts an isometric view of a vent plug, according to one or more aspects described herein.

As described above, the multi-part lid 104 may also include an opening 110 extending through the upper portion 202, the lower portion 210, the insulating portion 219, and/or the bottom cap 224 which can be used in conjunction with the vent 107 or vent plug 108. Advantageously, the vent 107 may be used to vent air from inside the container 100 to outside of the container 100. Thus, the vent 107 may be used to relieve pressure within the container 100 or otherwise to equalize the pressure within the container with the ambient pressure. As shown in FIGS. 11, 12A, and 12B, the vent plug 108 may include an upper knob portion 280 and a lower engagement portion 282 having a threaded outer wall 284.

As shown in FIG. 11, the lower engagement portion 282 is configured to engage the opening 110 of the lid 104. The lower engagement portion 282 may be substantially cylindrical and may include one or more arms 284 extending downward. As shown in FIG. 11, the arms 284 may include a threads 286 on the outer surface 285 of the lower engagement portion. As will be discussed in greater detail below, arms 284 may be deformable. The vent plug 108 may also include a ridge 288 around the perimeter of the lower engagement portion 282 which may create a channel 289 around the perimeter of the vent plug 108. Channel 289 may be used to retain a gasket 290. Gasket 290 may assist in creating a seal between the vent plug 108 and the lid 104.

As shown in FIGS. 12A and 12B the vent plug 108 may be constructed of separate parts including the upper knob portion 280, the lower engagement portion 282, and an insulating portion 291 which may comprise an insulating plug 292. The lower engagement portion 282 may include an internal cavity 296 and the insulating portion 291 or insulating plug 292 may be configured to fit within the internal cavity 296.

The upper knob portion 280, the lower engagement portion 282, and the insulating plug 292 may be assembled together as shown in FIG. 12B. The upper knob portion 280, and the lower engagement portion 282 may be permanently fastened together using techniques such as spin welding. In some embodiments, the insulation portion 291 may be air or may be vacuum sealed. In other examples, the insulation portion 291 may be a polymer foam, such as polystyrene. In still other embodiments, the insulation portion 291 may comprise an insulating plug 292 which may be constructed similar to insulating puck 220.

The upper knob portion 280 and the lower engagement portion 282, may be separately molded. In other embodiments, however, the upper knob portion 280 and lower engagement portion 282 may be integrally molded. In such integrally molded embodiments, insulating portion 291 may not be included in the vent plug 108 or the insulating portion may simply be an air pocket, a vacuum-sealed cavity, or may contain a mass of an insulating material such as a polymer foam, including polystyrene.

Figure 13A:
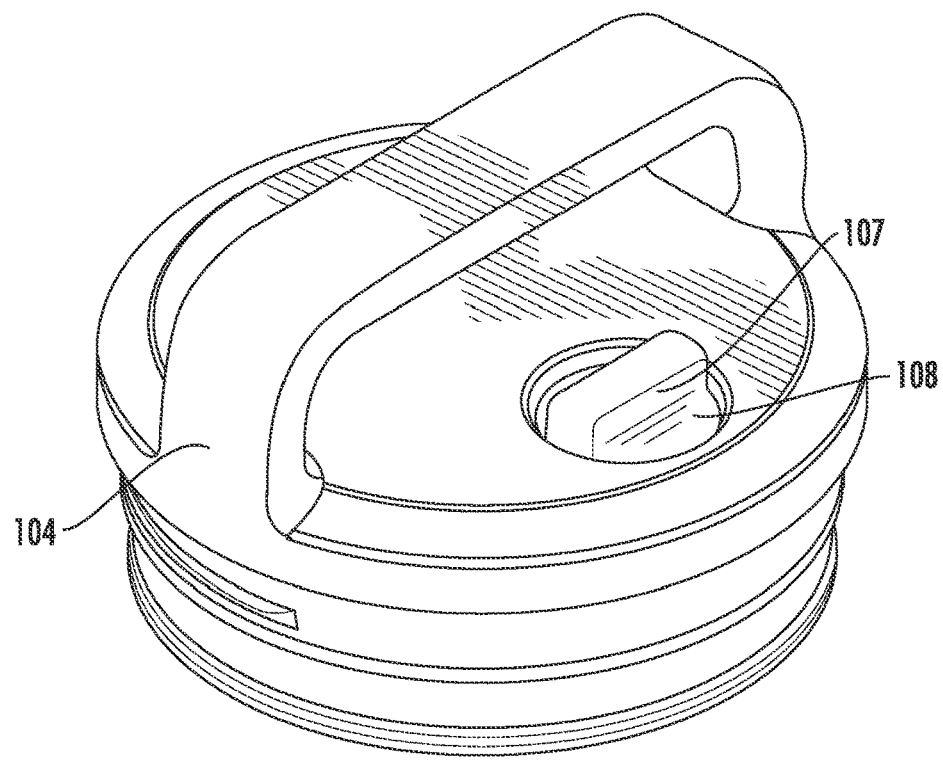
FIG. 13A depicts an isometric view of a lid with a vent plug in the closed position, according to one or more aspects described herein.
Figure 13B:
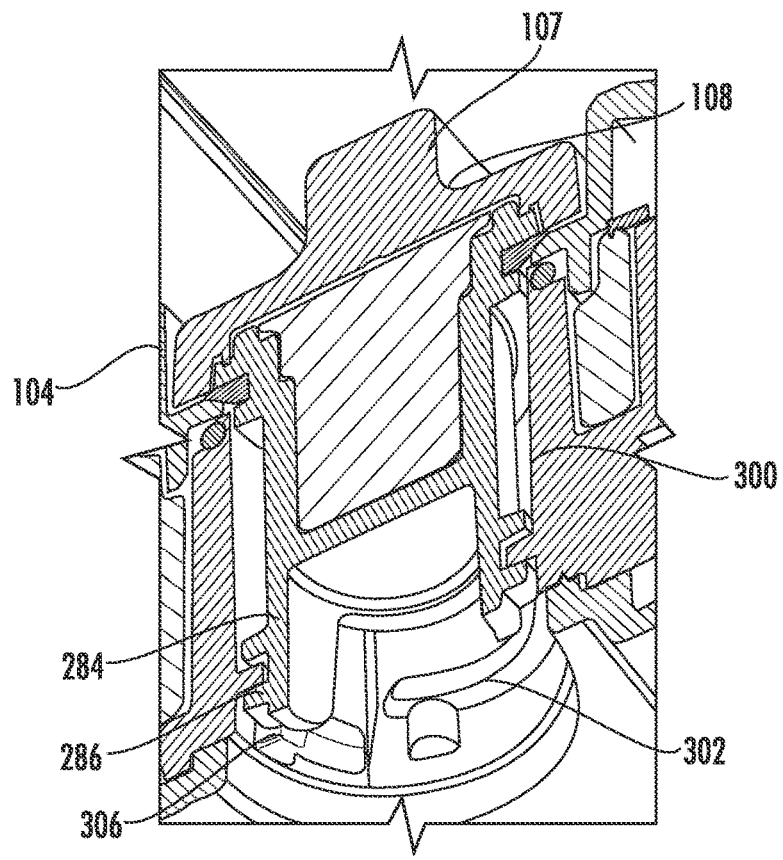
FIG. 13B depicts an isometric cross-sectional view of a portion of a lid with a vent plug in the closed position, according to one or more aspects described herein.
Figure 14A:
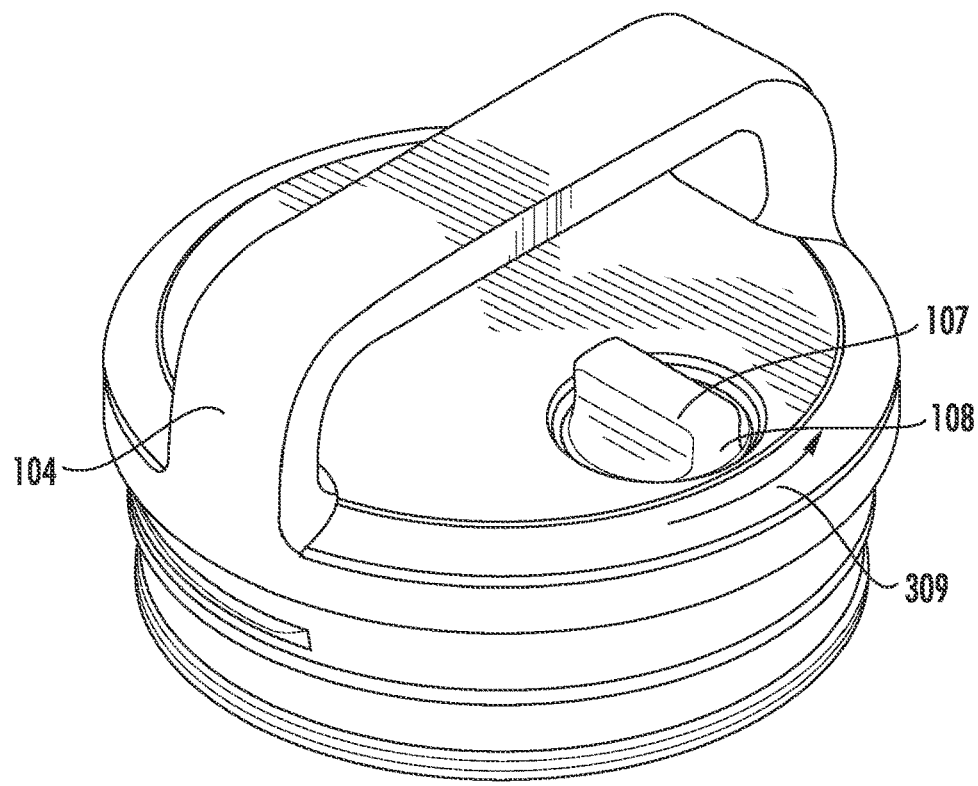
FIG. 14A depicts an isometric view of a lid with a vent plug in the venting position, according to one or more aspects described herein.
Figure 14B:
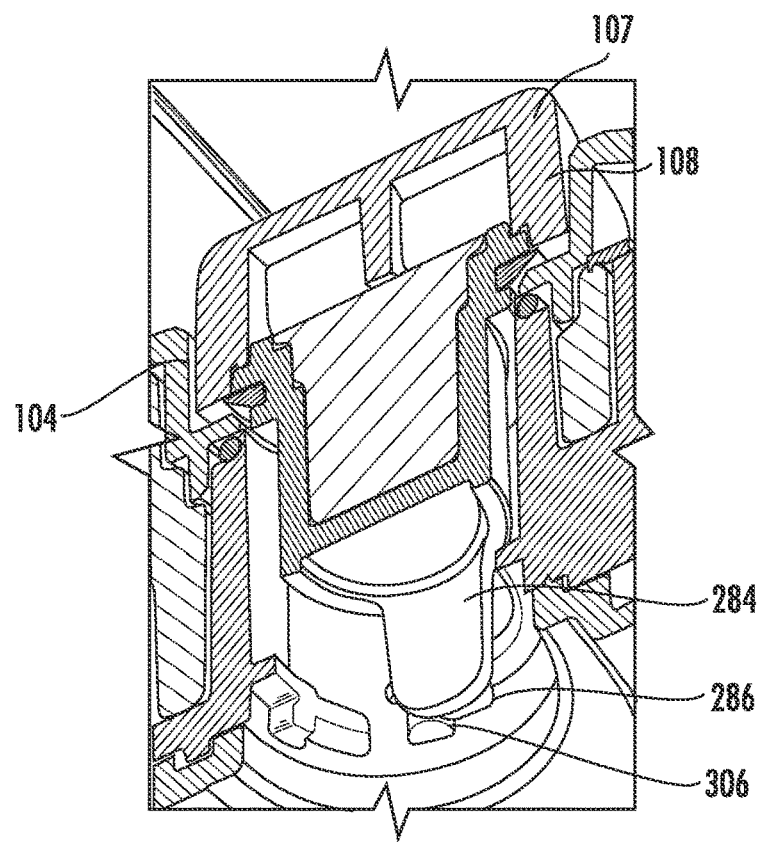
FIG. 14B depicts an isometric cross-sectional view of a portion of a lid with a vent plug in the venting position, according to one or more aspects described herein.
Figure 15A:
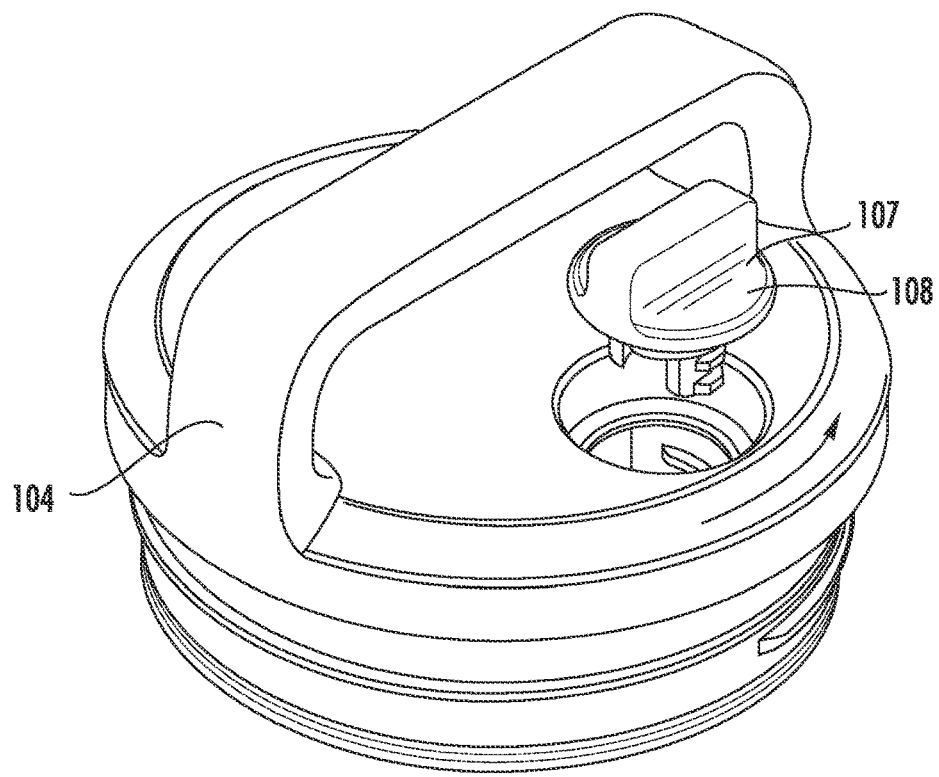
FIG. 15A depicts an isometric view of a lid with a vent plug in the disengaged position, according to one or more aspects described herein.
Figure 15B:
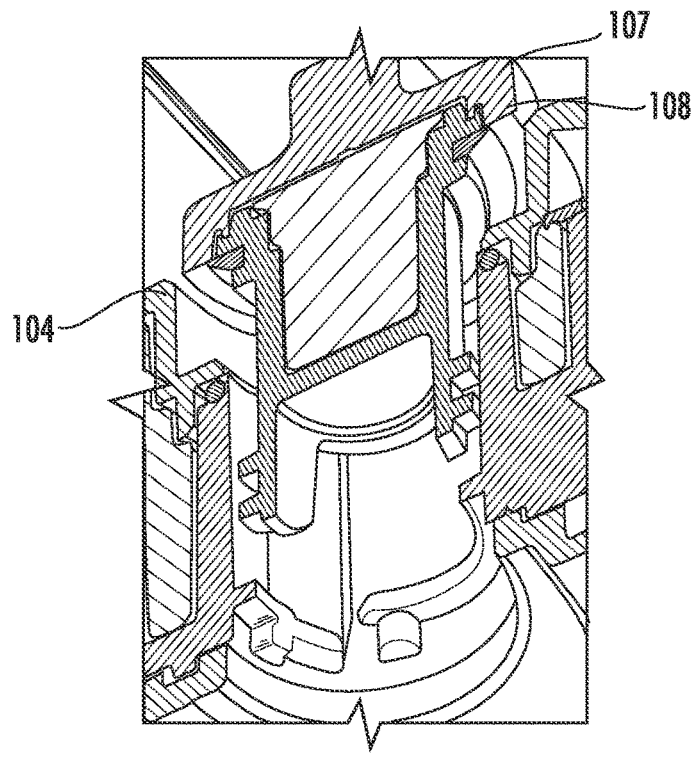
FIG. 15B depicts an isometric cross-sectional view of a portion of a lid with a vent plug in the disengaged position, according to one or more aspects described herein.

Returning now to the lid 104, the lid 104 may include an opening 110 (or vent opening) passing through the upper portion 202, the lower portion 210, the insulating portion, and/or the bottom cap 224 (or bottom lid cap). The lid 104 may include an outer surface 300 in the opening 110 and the outer surface may be formed by one or more of the upper portion 202, the lower portion 210, and the bottom cap 224. The outer surface 300 may include threads 302 configured to engage the threaded outer surface of the vent plug 108. As shown in FIGS. 13B, 14B, and 15B, the outer surface 300 may also include one or more retaining lugs 304 in the recessed thread path 305 of the threads 302. As will be described in more detail below, the outer surface 300 may include one or more closed position retaining lugs 306 and one or more venting position retaining lugs 308. Advantageously these lugs 304, 306, 308 may assist in retaining the plug vent 108 in the location chosen by a user.

As described above, the vent plug 108 is rotatable between a first closed position, a second venting position, and a third disengaged position. The closed position is shown in FIG. 13A and shown in cross-section in FIG. 13B. The venting position is shown in FIG. 14A and shown in cross-section in FIG. 14B. The disengaged position is shown in FIG. 15A and shown in cross-section in FIG. 15B. The vent plug 108 may be moved in a tightening direction or a loosening direction. Arrows 309 in FIGS. 14A and 15A depict the loosening direction.

As shown in FIGS. 13A and 13B, the vent plug 108 is shown in the closed position. In this position, gasket 290 is compressed between the lid 104 and the vent plug 108. In the closed position, air is restricted from entering or exiting the container 100 through opening 110. As shown in FIG. 13B, the threads 286 of the vent plug arm 284 are on a tightened side of the closed position retaining lug 306 (and similarly, though not shown, the threads 286 of the second vent plug arm 284 may be on a tightened side of a second closed position retaining lug 306).

As the user rotates the vent plug 108 from the closed position, shown in FIGS. 13A and 13B, in the loosening direction, shown by arrow 309, the vent plug arm 284 may deform inward to allow the threads 286 to move over the closed position retaining lug(s) 306. In some embodiments, the vent plug 108 may provide feedback as the threads travel over the closed position retaining lug 306, such as tactile or audible feedback, to a user to alert the user that the vent plug 108 has been rotated between the closed position and the venting position. Thus, a user may be able to feel and/or hear when the threads 286 move over the closed position retaining lug(s) 306.

FIGS. 14A and 14B, depict the venting position, wherein the threads 286 of the vent plug arm 284 are between the closed position retaining lugs 306 and the venting position retaining lugs 308. In this position air may be vented out of the container 102 and/or allow pressure within the container to equalize with ambient air pressure. Similar to the movement between the closed position and the open position, the movement between the venting position and the open position requires that a user rotate the threads of the vent plug 108 over lugs 304. As the user rotates the vent plug 108 from the venting position, shown in FIGS. 14A and 14B, in the loosening direction, shown by arrow 309, the vent plug arm 284 may deform to allow the threads 286 to move over the venting position retaining lug(s) 308. In some embodiments, the vent plug 108 may provide feedback, such as tactile or audible feedback, to a user to alert the user that the vent plug has been rotated from between the venting position and the disengaged position. Thus, a user may be able to feel and/or hear when the threads 286 to move over the venting position retaining lug(s) 308.

FIGS. 15A and 15B, depict the disengaged position, wherein the threads 286 of the vent plug arm 284 are loosened beyond the venting position retaining lugs 308. In the disengaged position the vent plug 108 may be freely removed from the remaining portions of the lid 104. Advantageously this allows a user to wash the vent plug. The vent plug may be tightened similar to the loosening procedure described above by rotating the vent plug 108 in the tightening direction.

In one example the vent plug 108 may be moved between a first closed position, a second venting position, and a third disengaged position by rotating the vent plug 108 relative to the rest of the lid 104 through an angle. For example, as shown in FIGS. 13-15, the vent plug 108 may be moved from the first closed position to the third disengaged position by rotating the cap 308 by approximately ½ of one full revolution, or in other embodiments approximately ¼ of one full revolution, approximately ⅓ of one full revolution, approximately 1 full revolution, approximately 2 full revolutions, approximately 3 full revolutions, at least one revolution, or at least five revolutions, among many others. As shown in FIGS. 13-15 each of the first closed position, the second venting position, and the third disengaged position may be separated by about ¼ of a revolution of the vent plug 108 relative to the rest of the lid 104.

In one implementation, one or more portions of the multi-part lid 104, including the upper portion 202, may be magnetically attracted to the vent plug 108. For example, the upper lid portion 202 may include a magnetic surface which may comprise a polymer outer layer over a ferromagnetic structure (i.e. a metal plate may be positioned below magnetic surface in order for the magnetic surface to attract a magnet embedded the vent plug 108. In another implementation, the magnetic surface may comprise a polymer overmolded over a magnet structure (i.e. a magnet may be positioned within the lid 104 as it is being molded.

The term "magnetic," as utilized herein, may refer to a material (e.g. a ferromagnetic material) that may be magnetized. As such, the term "magnetic" may imply that a material (i.e. a surface, or object, and the like) may be magnetically attracted to a magnet (i.e. a temporary or permanent magnet) that has an associated magnetic field. In one example, a magnetic material may be magnetized (i.e. may form a permanent magnet). Additionally, various examples of magnetic materials may be utilized with the disclosures described herein, including nickel, iron, and cobalt, and alloys thereof, among others.

Although lid 104 and canister 102 are discussed herein as a single container 100 each of the lid 104 and canister 102 may be used with different lids and/or canisters to form different containers. For example, the canister 102 can be used with other known lids and lid 104 can be used with other known canisters.

Figure 16C:
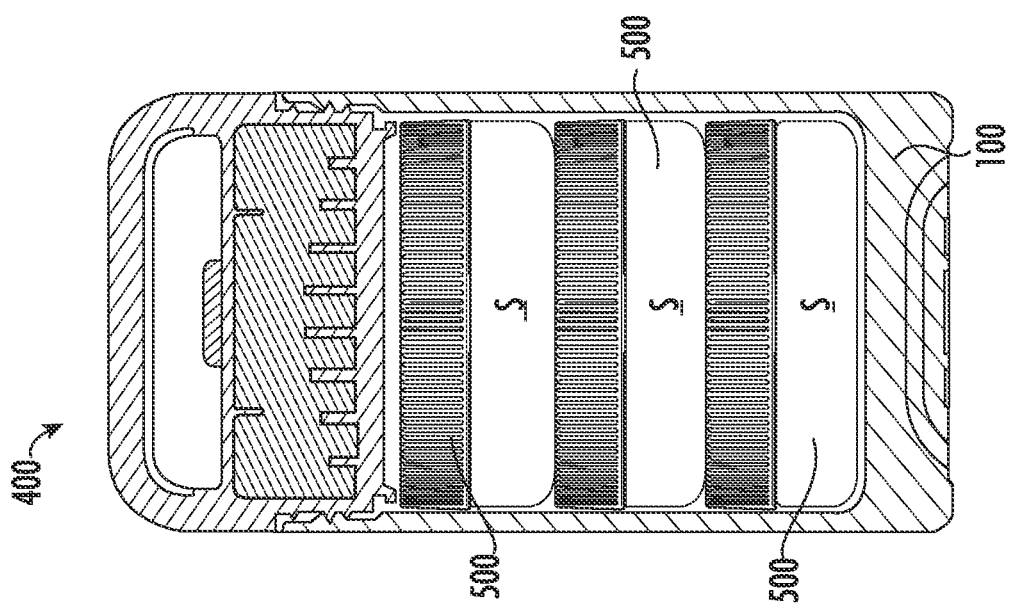
FIGS. 16A-16E depict simplified exemplary cross-sectional views of a container system, according to one or more aspects described herein.
Figure 16B:
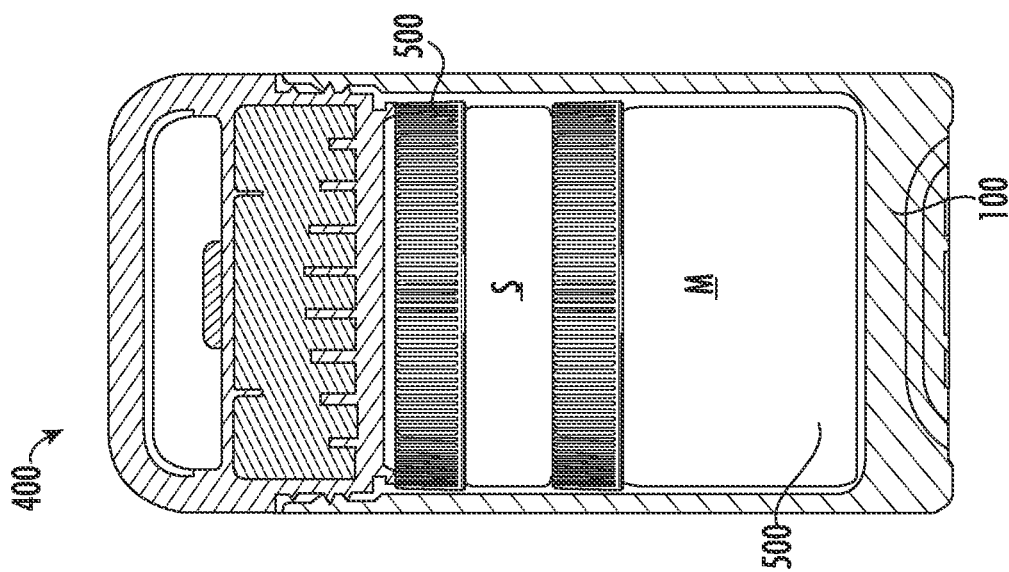
Figure 16A:
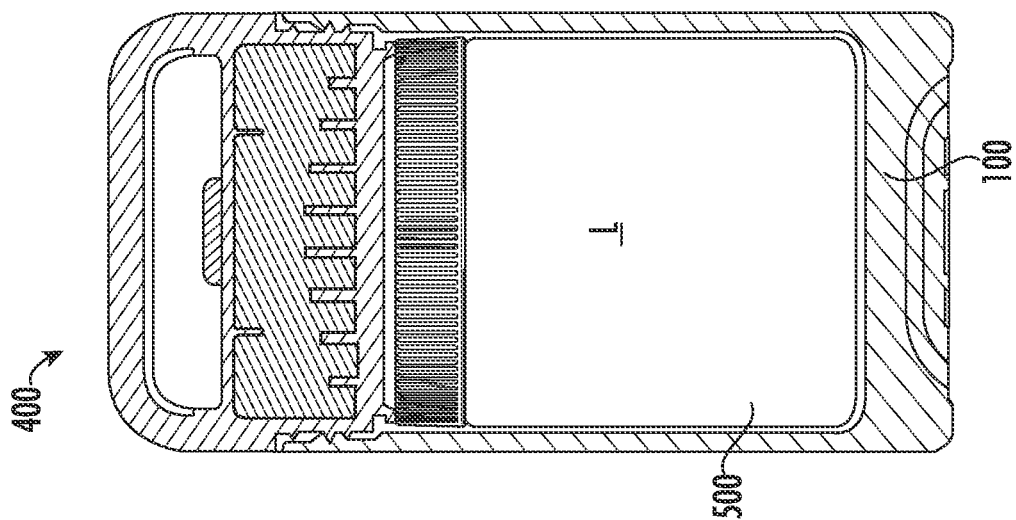
Figure 16D:
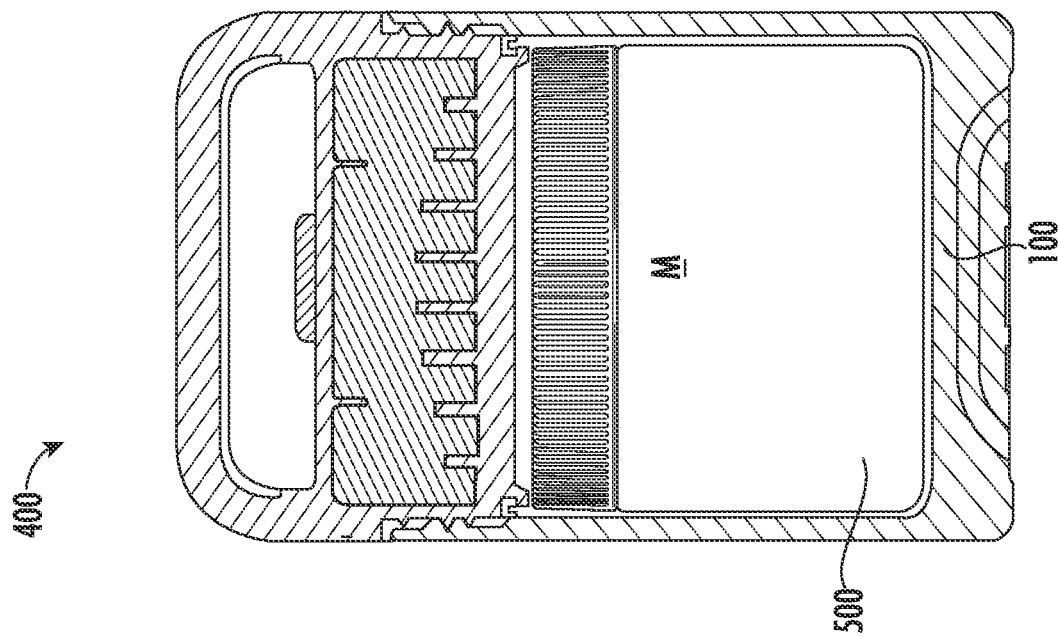
Figure 16E:
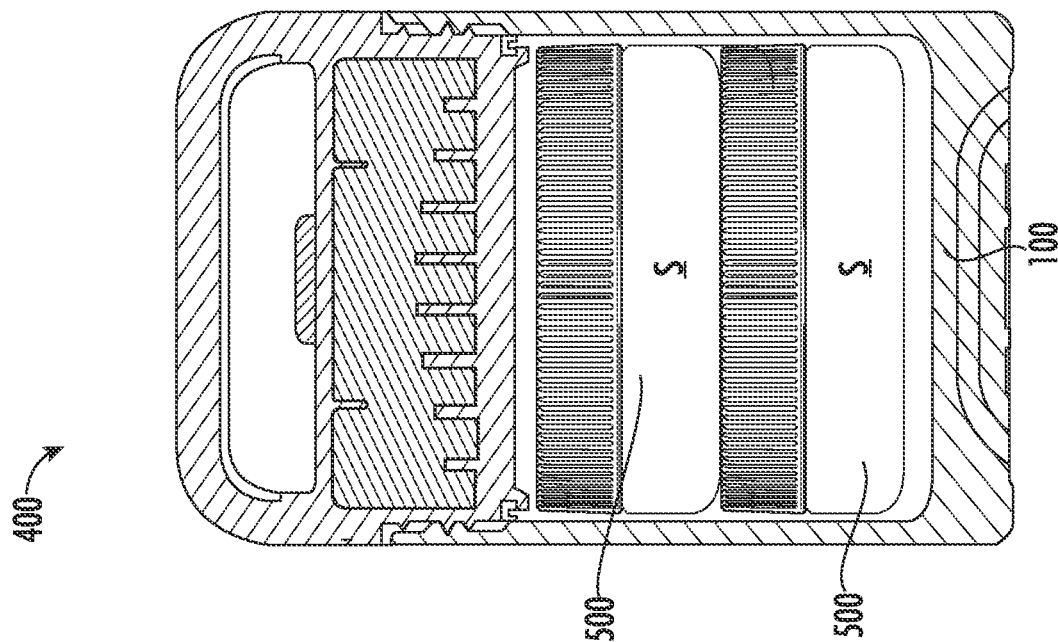

In addition, the insulated container 100 may be part of a container kit or system 400 where an inner container 500 or a plurality of inner containers 500 may be secured within the storage portion 105 of the insulated container 100 as shown in FIGS. 16A-16E. The inner container 500 may have an outer surface sized to fit within the storage portion 105 of the insulated container 100. The insulated container 100 may secure a single inner container 500 as shown in FIG. 16A, two inner containers 500 having different heights as shown in FIG. 16B, or three inner containers having the same height as shown in FIG. 16C. As another option, the system 400 may comprise more than three inner containers 500.

As shown in FIGS. 16A-16E, the number of inner containers 500 secured within the insulated container 100 may depend upon the height of the insulated container 100 and the height of the inner container 500. As shown in FIGS. 17A-17C, the height of the inner container may vary depending upon the amount volume of liquid or food the inner container 500 can store. The exemplary embodiment in FIGS. 17A-17C display three different inner containers, each having a different height, H1, H2, H3. Within the exemplary embodiment, H1 is greater than H2 and H3, and H2 is greater than H3. While the exemplary embodiment illustrates three heights, the inner containers 500 may have any number of heights. In addition, as shown in the exemplary embodiment, the inner containers 500 may have a cylindrical shape with a substantially similar outer diameter, D, such that a lid 520 may be interchangeable to any of the different height inner containers 500. The outer diameter, D, is smaller than the diameter of the opening 116 of the canister 102. In the configurations illustrated in FIGS. 16B-16D, each inner container 500 may be stacked on top of another inner container 500 inside the storage portion 105 of the insulated container 100.

Figure 18:
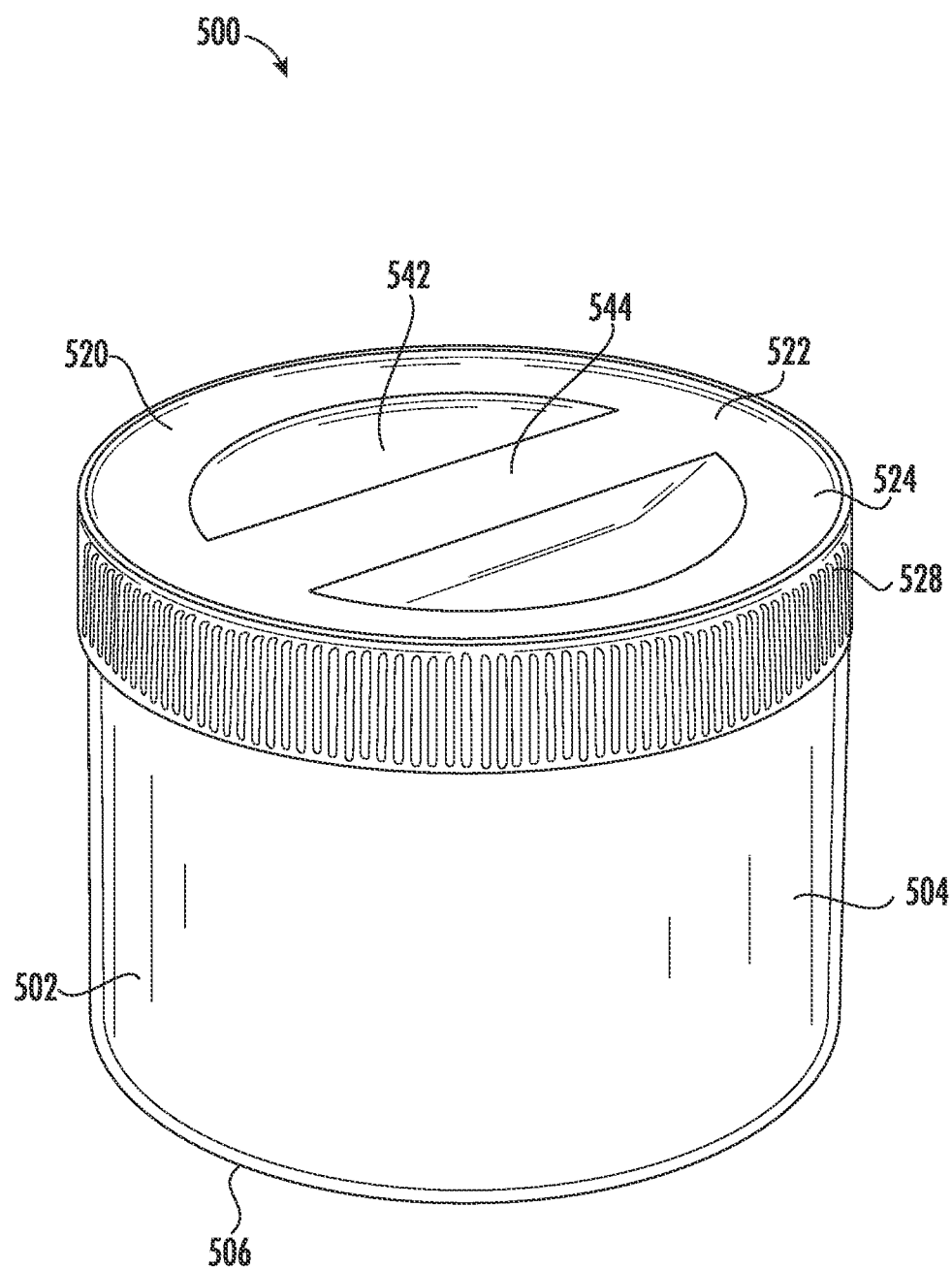
FIG. 18 depicts an isometric view of an inner container, according to one or more aspects described herein.
Figure 19:
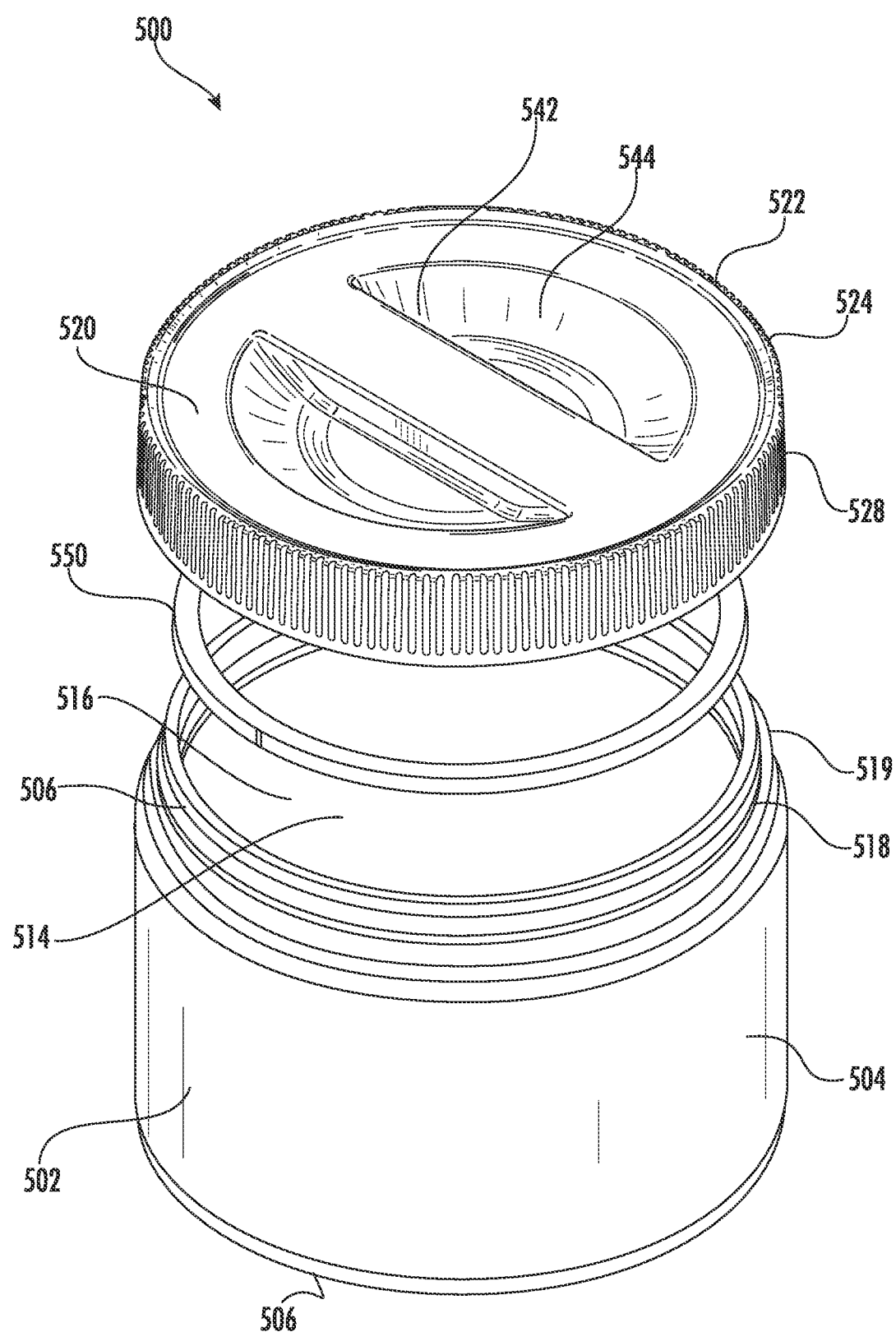
FIG. 19 depicts an exploded isometric view of an inner container of FIG. 17, according to one or more aspects described herein.
Figure 20:
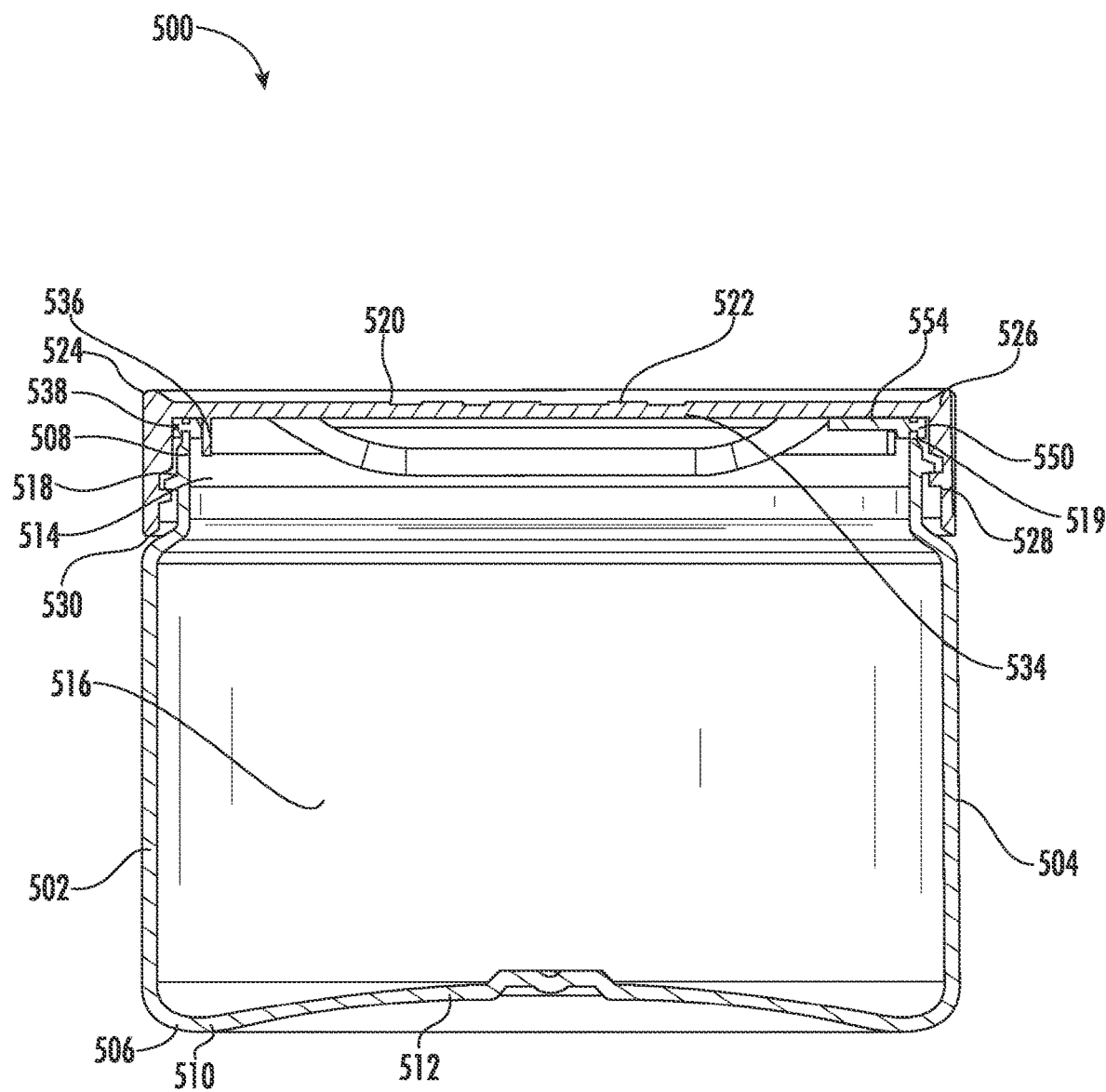
FIG. 20 depicts a cross-sectional view of the inner container of FIG. 17, according to one or more aspects described herein.

As shown in FIGS. 18-20, the inner container 500 may comprise a canister, or bottom portion, 502 with a lid 520 removably coupled thereto. And the inner container 500 may include a gasket 550 positioned between the canister 502 and the lid 520, such that when the lid 520 is attached to the canister 502, the gasket 550 is in contact with both the lid 520 and the canister 502. In the embodiment illustrated in FIGS. 18-20, the inner container 500 may be substantially cylindrically shaped to match the opening 116 of the canister 102 of the insulated container 100. Alternatively, the inner container 500 may be substantially cuboidal, or prismoidal (e.g. a pentagonal prism, hexagonal prism, heptagonal prism, among others) in shape.

Figure 21:
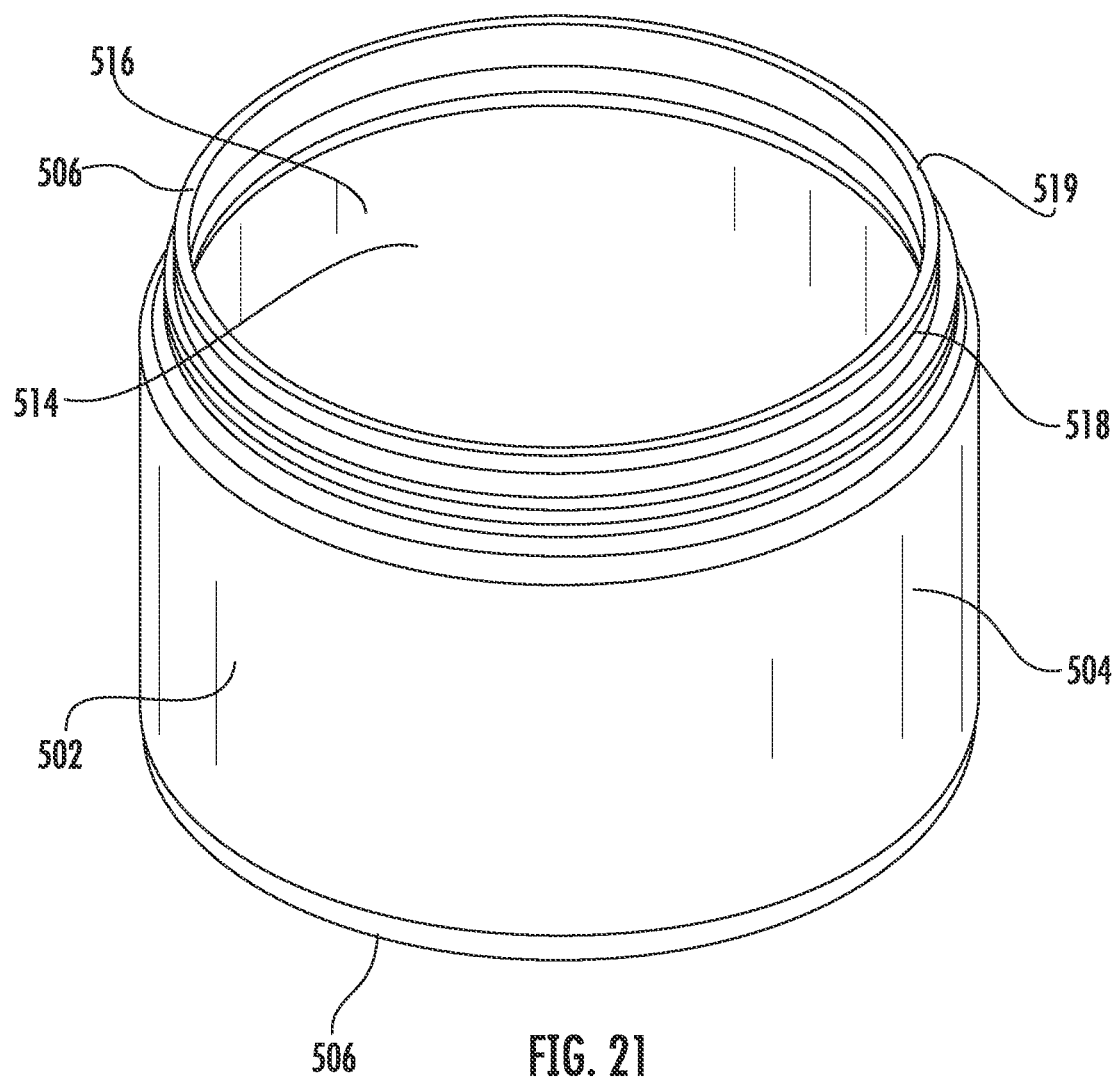
FIG. 21 depicts an isometric view of a canister portion of the inner container of FIG. 17, according to one or more aspects described herein.
Figure 22:
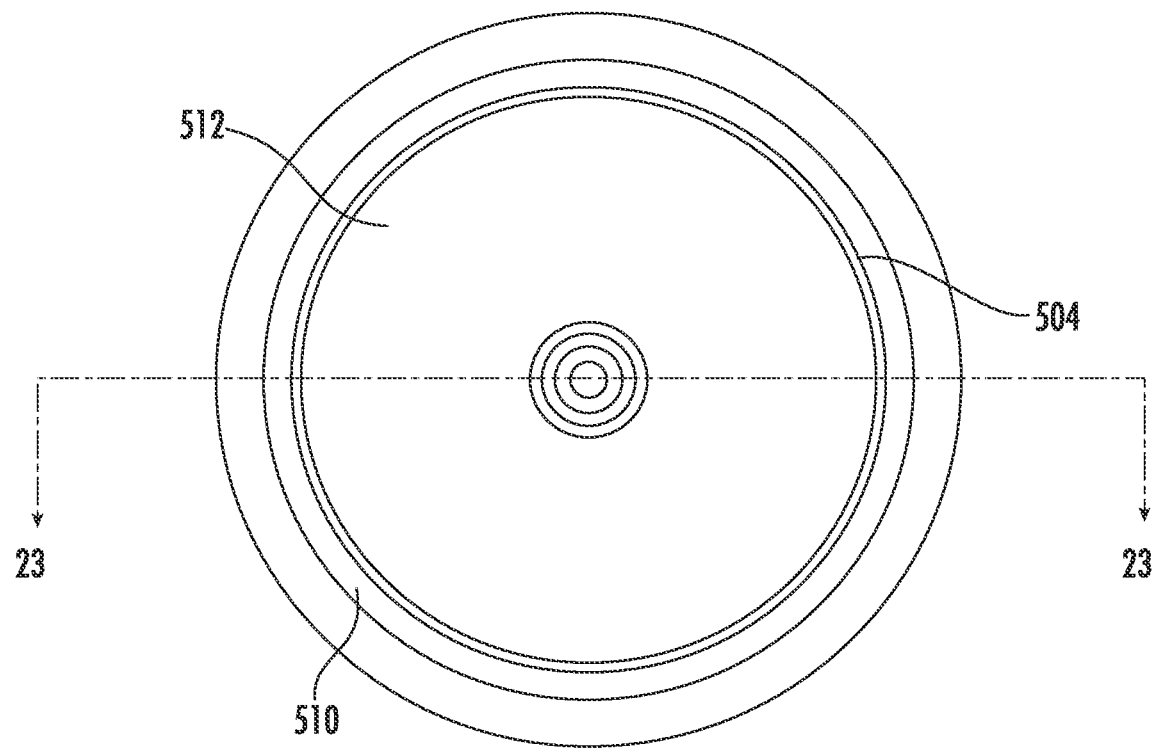
FIG. 22 depicts a bottom view of the canister portion of the inner container of FIG. 21, according to one or more aspects described herein.
Figure 23:
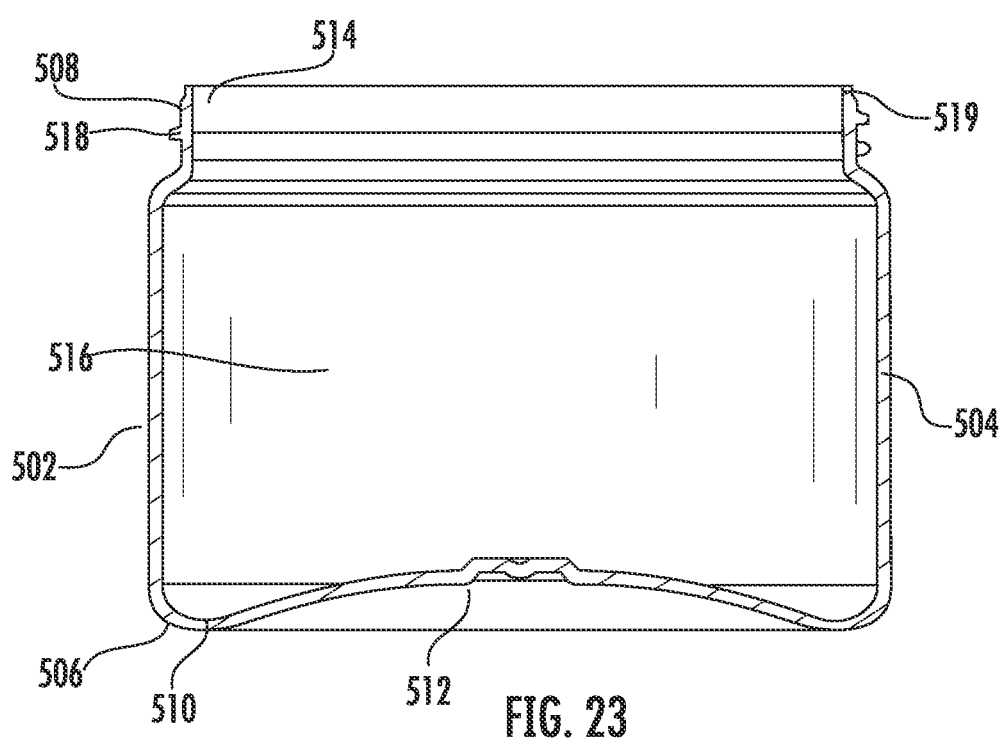
FIG. 23 depicts a cross-sectional view of the canister portion of the inner container of FIG. 22, according to one or more aspects described herein.
Figure 24:
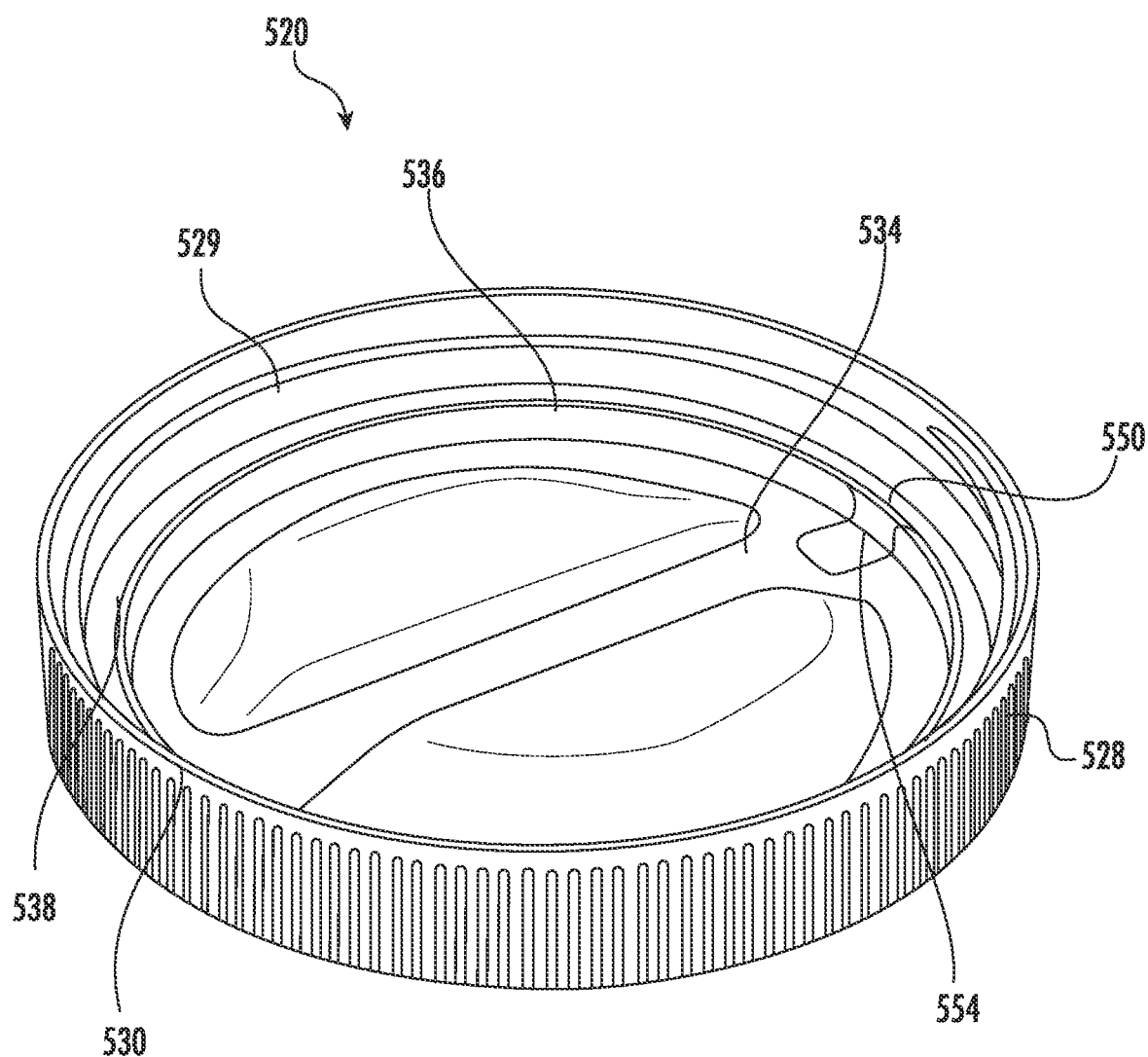
FIG. 24 depicts an isometric view of the bottom of the lid of the inner container of FIG. 17, according to one or more aspects described herein.
Figure 25:
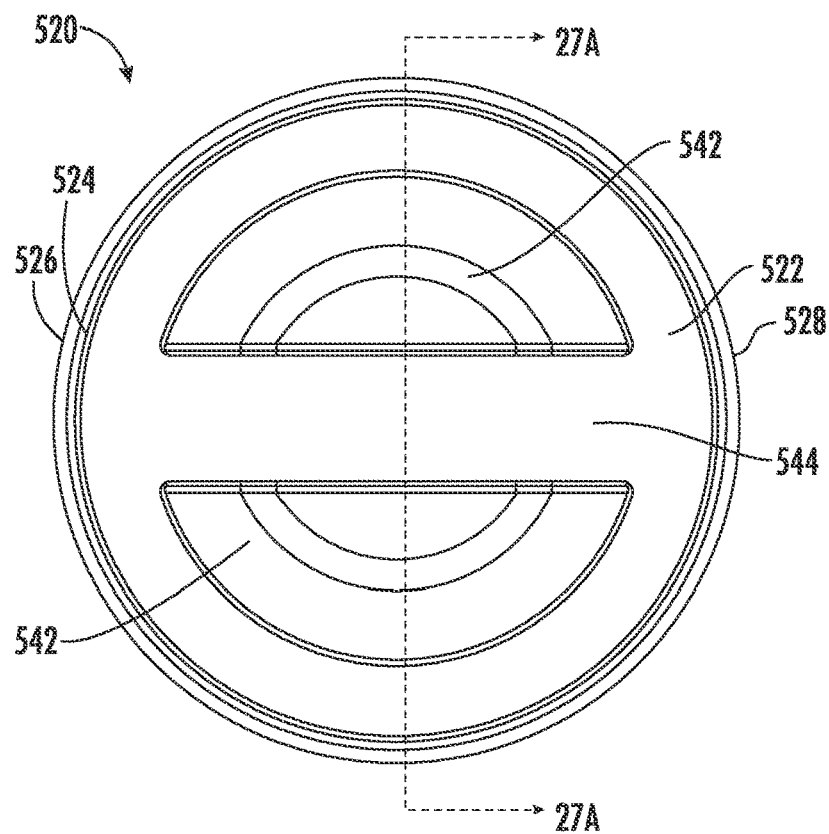
FIG. 25 depicts a top view of the lid of the inner container of FIG. 17, according to one or more aspects described herein.
Figure 26:
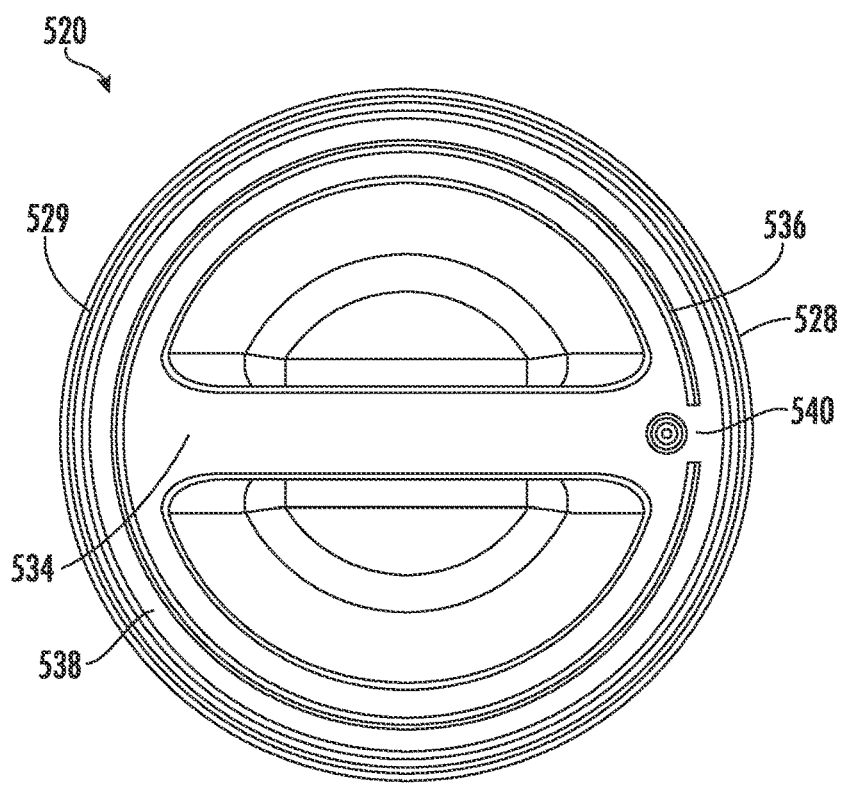
FIG. 26 depicts a bottom view of the lid of the inner container of FIG. 25, according to one or more aspects described herein.
Figure 27A:
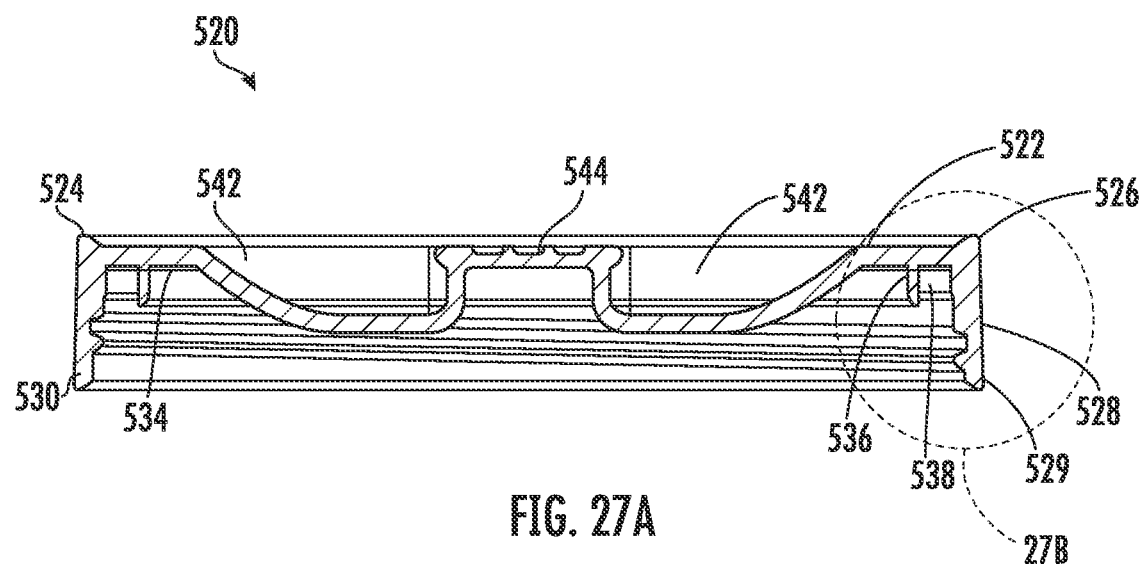
FIG. 27A depicts a cross-sectional view of the lid of FIG. 25, according to one or more aspects described herein.
Figure 27B:
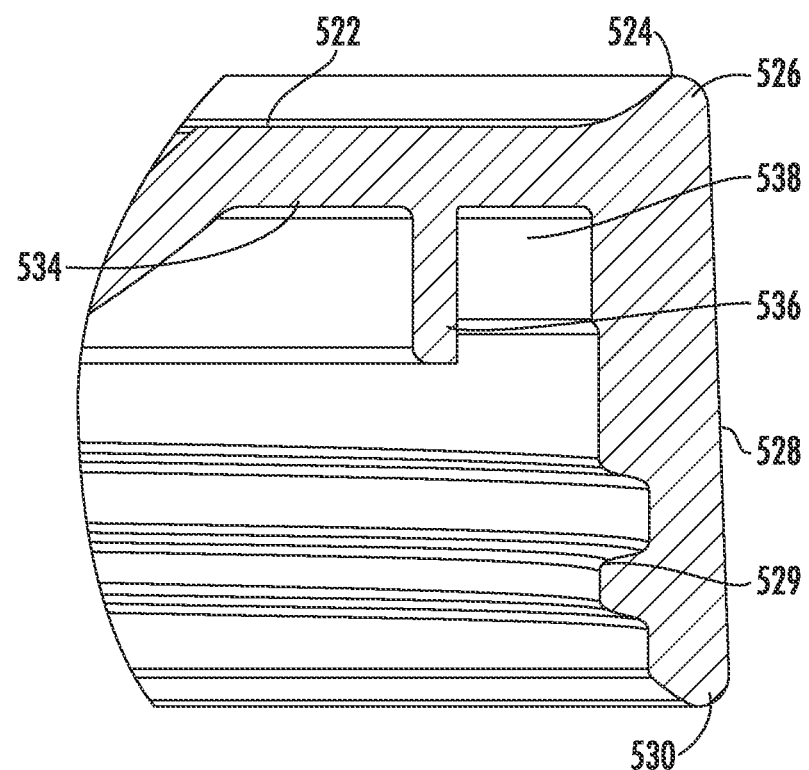
FIG. 27B depicts a detailed portion of the cross-sectional view of the lid of FIG. 27A, according to one or more aspects described herein.

As shown in FIGS. 21-23, the canister 502 may have a substantially cylindrical sidewall 504 having a bottom end 506 and a top end 508 opposite the bottom end 506. The bottom end 506 forms the bottom surface 510 configured to support the canister 502 on a surface. The bottom surface 510 may comprise a centrally located domed surface 512. The top end 508 may have an opening 514 to allow access to the storage portion 516. The top end 508 may have an engaging portion 518 to engage a complimentary engaging portion 529 on the lid 520. In addition, the engaging portion 518 may comprise external threads positioned at the top end 508 of the canister 502 to engage internal threads 529 on the lid 520 to seal the container 500.

The top end 508 may also have an upper edge 519 that contacts the gasket 550 when the lid 520 is secured to the canister 502. The upper edge 519 may fit into a channel 552 positioned within the gasket 550 to ensure the canister 502 properly engages to the gasket 550 to seal the inner container 500 when the lid 520 is secured to the canister 502.

As shown in FIGS. 24-27B, the lid 520 may be adapted to seal the opening 514 of the canister 502. The lid may have a top surface 522 having a lip 524 along a peripheral top edge 526 of the top surface 522. The lip 524 may be positioned above the top surface 522. The lip 524 may help to position or nest another inner container 500 if it is placed onto the top surface 522. A sidewall 528 adjacent the lip 524 may extend from the peripheral top edge 526 to the bottom end 530. The bottom end 530 may have an opening 532 and an interior base surface 534 opposite the top surface 522. The interior base surface 534 may have a substantially cylindrical wall 536 forming the groove 538 along the interior base surface 534. The gasket 550 may fit within the groove 538 such that when the lid 520 is attached to the canister, the gasket 550 is in contact with both the lid 520 and the canister 502 helping to seal the inner container 500. The substantially cylindrical wall 536 may have a gap 540 within the cylindrical wall to allow for a tab 554 on the gasket 550 to extend into and possibly through the gap 540. The gasket tab 554 may also lie substantially flush to the interior base surface 534 and allow for the easy removal of the gasket 550 for cleaning or replacement of the gasket 550.

The top surface 522 of the lid 520 may further comprise a pair of recesses 542 wherein at least one recess forming a handle or grab bar 544 to allow the easy removal of the inner container 500 from the insulated container 100. The pair of recesses 542 may be have a D-shape to form the handle or grab bar 544. The sidewall 528 may further have a texture such as vertical grooves or other features to enhance a user's grip to easily open and close the lid 520.

The canister 502 may be formed from a molding process such as blow molding, or more specifically injection blow molding, and may be formed from a translucent or transparent material allowing a user to see the contents of the container 500. The inner container 500 may be made of a polymer material, such as Tritan™, or other food-safe type polymer. In addition, while the majority of the canister 502 may have a clear or substantially clear finish, an upper portion of the canister may have a different texture or marking to designate a maximum fill line. The lid 520 may be formed from a molding process such as injection molding or similar process and may be formed from a polymer material, such as Tritan™, or other food-safe type polymer.

Figure 28:
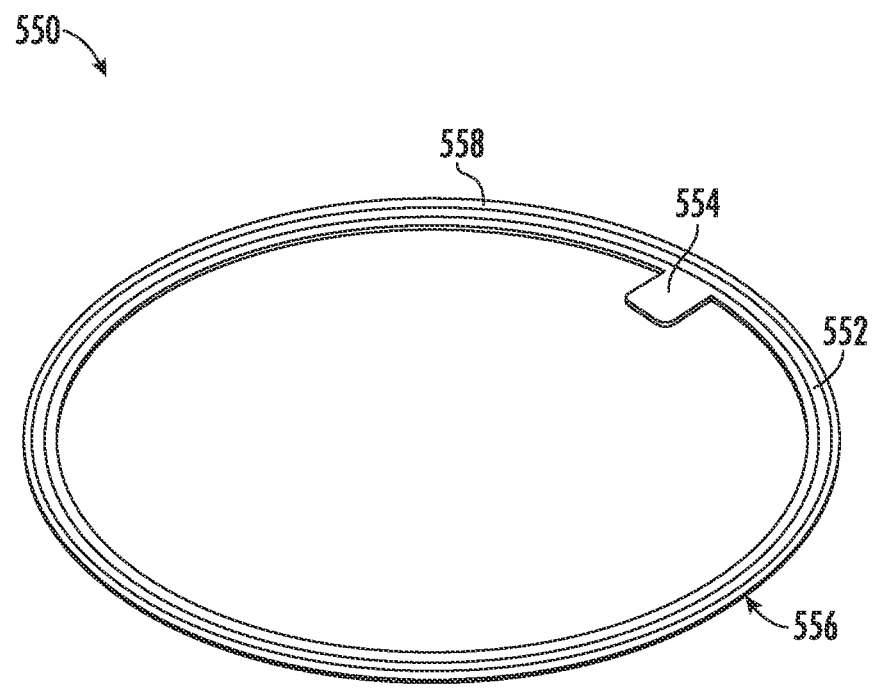
FIG. 28 depicts an isometric view of the gasket of the inner container of FIG. 17, according to one or more aspects described herein.
Figure 29:
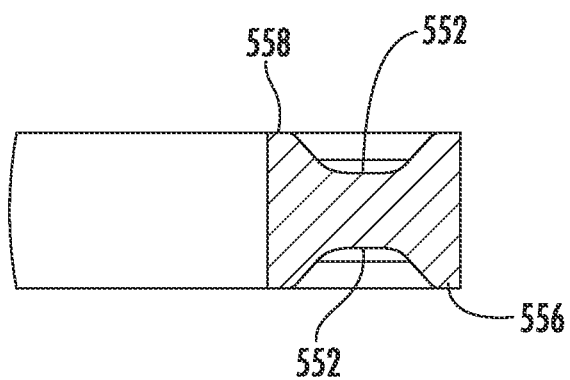
FIG. 29 depicts a detailed cross-sectional view of a portion of the gasket of FIG. 28, according to one or more aspects described herein.

FIGS. 28-29 illustrate the substantially cylindrical gasket 550 that may be positioned along the interior base surface 534 of the lid 520. As discussed above, the gasket 550 may have a tab 554 extending inward toward a center of the gasket 550. Also referenced above, the gasket 550 may have a channel or cylindrical recess 552 within on or both of the substantially planar upper and lower surfaces 556, 558. The tab 554 may also extend co-planar to the lower surface 558 of the gasket 550. The gasket 550 may be formed from a silicone rubber or other type of silicone polymer.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. An insulating container, comprising:
   a canister comprising:
      a sidewall structure having a first end and a second end, the first end configured to support the canister on a surface;
      an opening in the second end extending through the sidewall structure; and
      a neck structure encompassing the opening and extending in an axial direction;
   a multi-part lid adapted to seal the opening, the multi-part lid comprising:
      a lid component having a top surface and a vent opening extending through the lid component;
      a handle extending from the top surface; and
      a vent plug configured to equalize the air pressure within the canister with the ambient air pressure when the multi-part lid is connected to the canister;
      wherein the vent plug can be rotated relative to the lid component between a closed position wherein ambient air is restricted from entering or exiting the canister, a venting position wherein air pressure within the canister is configured to equalize with the ambient air pressure, and a disengaged position wherein the vent plug is removable from the lid component;
      wherein the vent plug and the lid component are magnetically attracted to each other; and
      wherein the vent plug includes a threaded portion, having threads, and a non-threaded portion, having no threads, and wherein air is configured to pass between the non-threaded portion of the vent plug and the lid component when the vent plug is in the venting position.

2. The insulating container of claim 1, wherein the vent plug is configured to be manually activated.

3. The insulating container of claim 1, wherein the vent plug is configured to be removable.

4. The insulating container of claim 1, wherein the sidewall structure is substantially cylindrical in shape.

5. The insulating container of claim 1, wherein the sidewall structure further comprises a sealed vacuum cavity between an inner wall and an outer wall.

6. An insulating container, comprising:
- a canister comprising:
  - a sidewall structure having a first end and a second end, the first end configured to support the canister on a surface;
  - an opening in the second end extending through the sidewall structure; and
  - a neck structure encompassing the opening and extending in an axial direction;
- a multi-part lid adapted to seal the opening, the multi-part lid comprising:
  - a lid component having a top surface;
  - a handle extending from the top surface; and
  - a vent plug configured to equalize the air pressure within the canister with the ambient air pressure when the multi-part lid is connected to the canister;
- wherein the vent plug can be rotated relative to the lid component between a closed position wherein ambient air is restricted from entering or exiting the canister, a venting position wherein air pressure within the canister is configured to equalize with the ambient air pressure, and a disengaged position wherein the vent plug is removable from the lid component;
  - wherein the vent plug and the lid component are magnetically attracted to each other; and
  - wherein the vent plug includes a threaded portion, having threads, and a non-threaded portion, having no threads, and wherein air is configured to pass between the non-threaded portion of the vent plug and the lid component when the vent plug is in the venting position.

7. The insulating container of claim 6, wherein the vent plug is configured to be manually activated.

8. The insulating container of claim 6, wherein the vent plug is configured to be removable from the multi-part lid.

9. The insulating container of claim 6, wherein the vent plug is configured to provide feedback to a user to alert the user that the vent plug has been rotated relative to the lid component between the closed position and the venting position.

10. The insulating container of claim 9, wherein the feedback is tactile feedback.

11. The insulating container of claim 9, wherein the feedback is audible feedback.

12. The insulating container of claim 6, wherein the sidewall structure is substantially cylindrical in shape.

13. The insulating container of claim 6, wherein an outer diameter of the neck structure is the same as the outer diameter of the sidewall structure.

14. The insulating container of claim 6, wherein the sidewall structure further comprises a sealed vacuum cavity between an inner wall and an outer wall.

15. The insulating container of claim 6, wherein the first end includes at least one D-shaped recess.

16. The insulating container of claim 1, further comprising a gasket engaged with the vent plug, the gasket configured to create a seal between the vent plug and the lid component.

17. The insulating container of claim 6, further comprising a gasket engaged with the vent plug, the gasket configured to create a seal between the vent plug and the lid component.

18. The insulating container of claim 1, wherein the lid component further comprises an upper lid portion engaged with a lower lid portion, the lower lid portion having a threaded sidewall.

19. The insulating container of claim 18, wherein the lid component further comprises an insulating puck engaged between the upper lid portion and the lower lid portion.

20. The insulating container of claim 6, wherein the lid component further comprises an upper lid portion engaged with a lower lid portion, the lower lid portion having a threaded sidewall.

21. The insulating container of claim 20, wherein the lid component further comprises an insulating puck engaged between the upper lid portion and the lower lid portion.

* * * * *